United States Patent
Murakami

(10) Patent No.: US 8,493,582 B2
(45) Date of Patent: Jul. 23, 2013

(54) IMAGE PROCESSOR, AN IMAGE PROCESSING SYSTEM, AND A METHOD OF EXECUTING JOBS

(75) Inventor: Hiroshi Murakami, Hoi-gun (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 992 days.

(21) Appl. No.: 11/588,232

(22) Filed: Oct. 27, 2006

(65) Prior Publication Data

US 2007/0146766 A1 Jun. 28, 2007

(30) Foreign Application Priority Data

Dec. 28, 2005 (JP) ................................ 2005-380468

(51) Int. Cl.
*G06K 15/00* (2006.01)

(52) U.S. Cl.
USPC ........ 358/1.14; 358/1.13; 358/1.15; 370/913; 370/313; 370/464; 370/469

(58) Field of Classification Search
USPC ............... 358/1.13, 1.14, 1.15; 370/913, 313, 370/464, 469
See application file for complete search history.

(56) References Cited

U.S. PATENT DOCUMENTS

| | | | |
|---|---|---|---|
| 8,269,995 B2 | 9/2012 | Niitsuma | |
| 2004/0127208 A1* | 7/2004 | Nair et al. | 455/420 |
| 2005/0052686 A1* | 3/2005 | Maruyama | 358/1.15 |
| 2005/0135829 A1 | 6/2005 | Miyazaki | |
| 2005/0193134 A1* | 9/2005 | Syrjala | 709/230 |
| 2005/0198379 A1* | 9/2005 | Panasyuk et al. | 709/239 |
| 2008/0192709 A1* | 8/2008 | Mikami et al. | 370/338 |

FOREIGN PATENT DOCUMENTS

| | | |
|---|---|---|
| JP | 10-016355 A | 1/1998 |
| JP | 11-149233 A | 6/1999 |
| JP | 2000-047534 | 2/2000 |
| JP | 2000-250730 | 9/2000 |
| JP | 2002-200826 | 7/2002 |
| JP | 2004-268535 | 9/2004 |
| JP | 2005-051336 | 2/2005 |
| JP | 2005-161677 | 6/2005 |
| JP | 2005-272080 | 10/2005 |
| JP | 2005-342939 | 12/2005 |

OTHER PUBLICATIONS

Notification of Reasons for Refusal in JP 2005-380468 dated May 27, 2008, and English Translation thereof.
Notification of Decision for Patent Grant issued in corresponding Japanese Patent Application No. 2008-274953, issued Aug. 31, 2009, and English translation thereof.

* cited by examiner

*Primary Examiner* — Jacky X Zheng
(74) *Attorney, Agent, or Firm* — Buchanan Ingersoll & Rooney PC

(57) ABSTRACT

An image processor comprising: a user information storage unit for storing information of a plurality of users; a plurality of different user information input units for inputting user information; a user information matching unit for determining whether or not user information inputted by said respective user information input units matches any of the user information registered in said user information storage unit; a job processing unit for executing jobs instructed by a user, whose user information is determined to match any of the registered user information by said user information matching unit; and a job processing control unit for restricting jobs that are processed by said job processing unit, depending on which user information input unit is used.

24 Claims, 12 Drawing Sheets

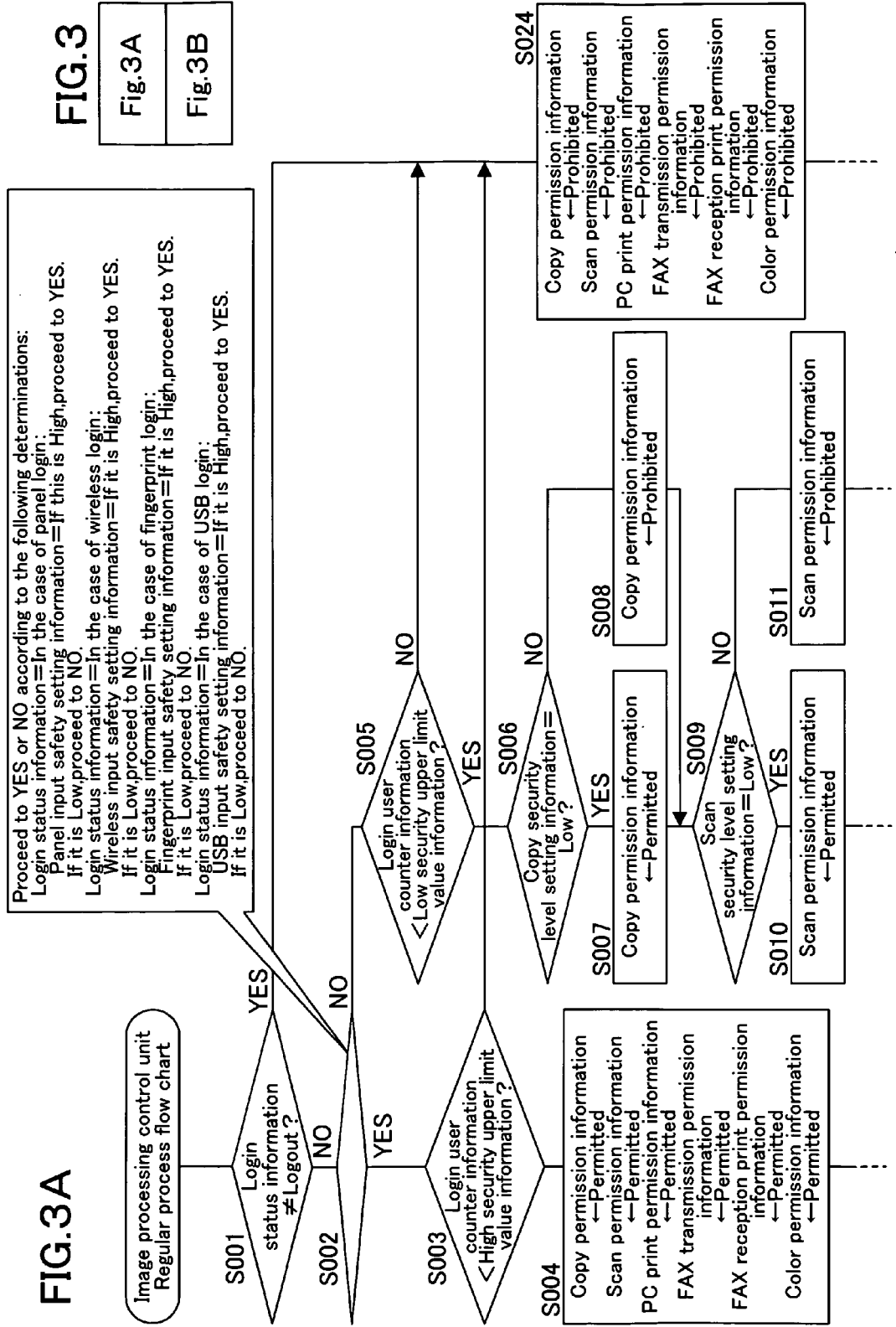

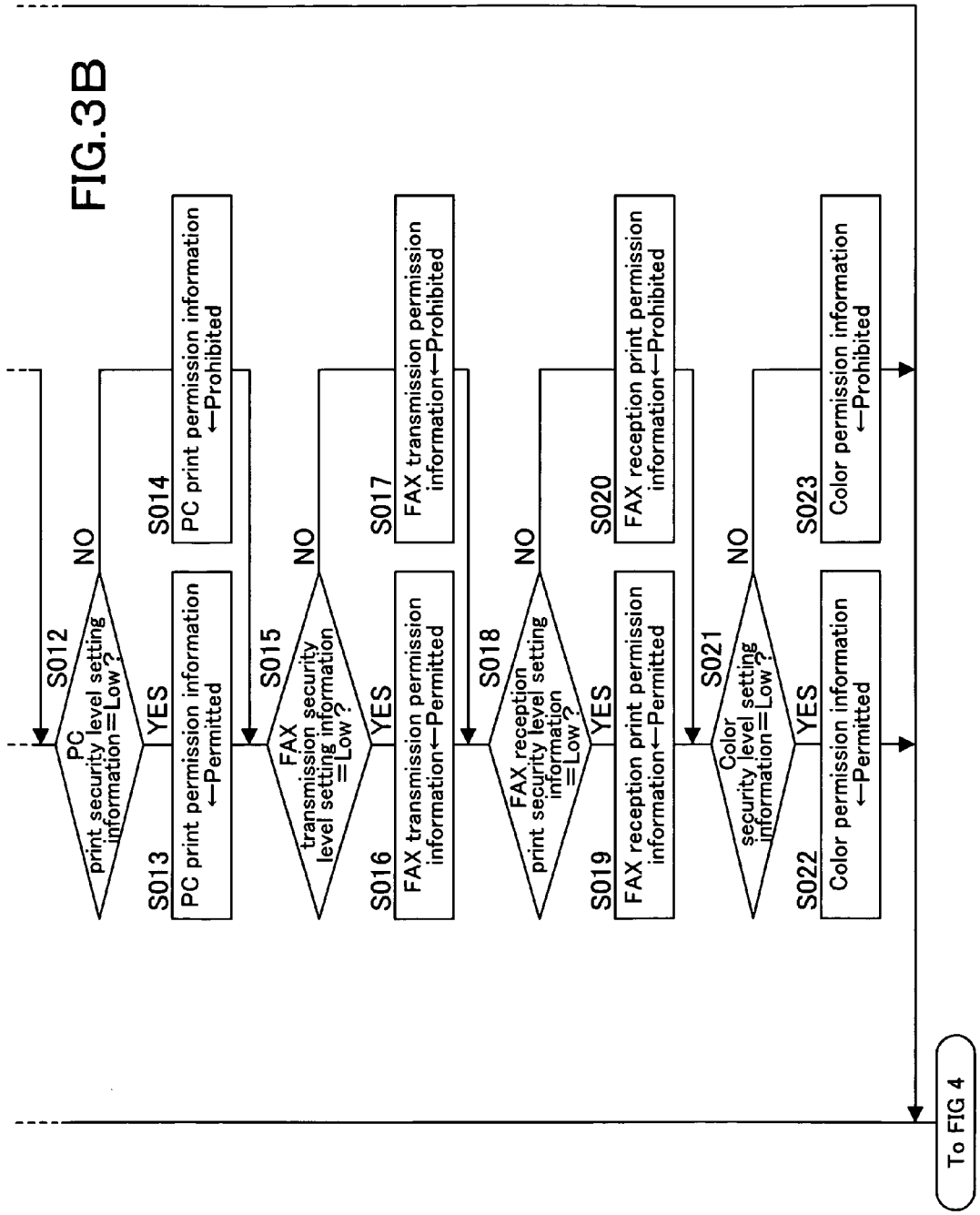

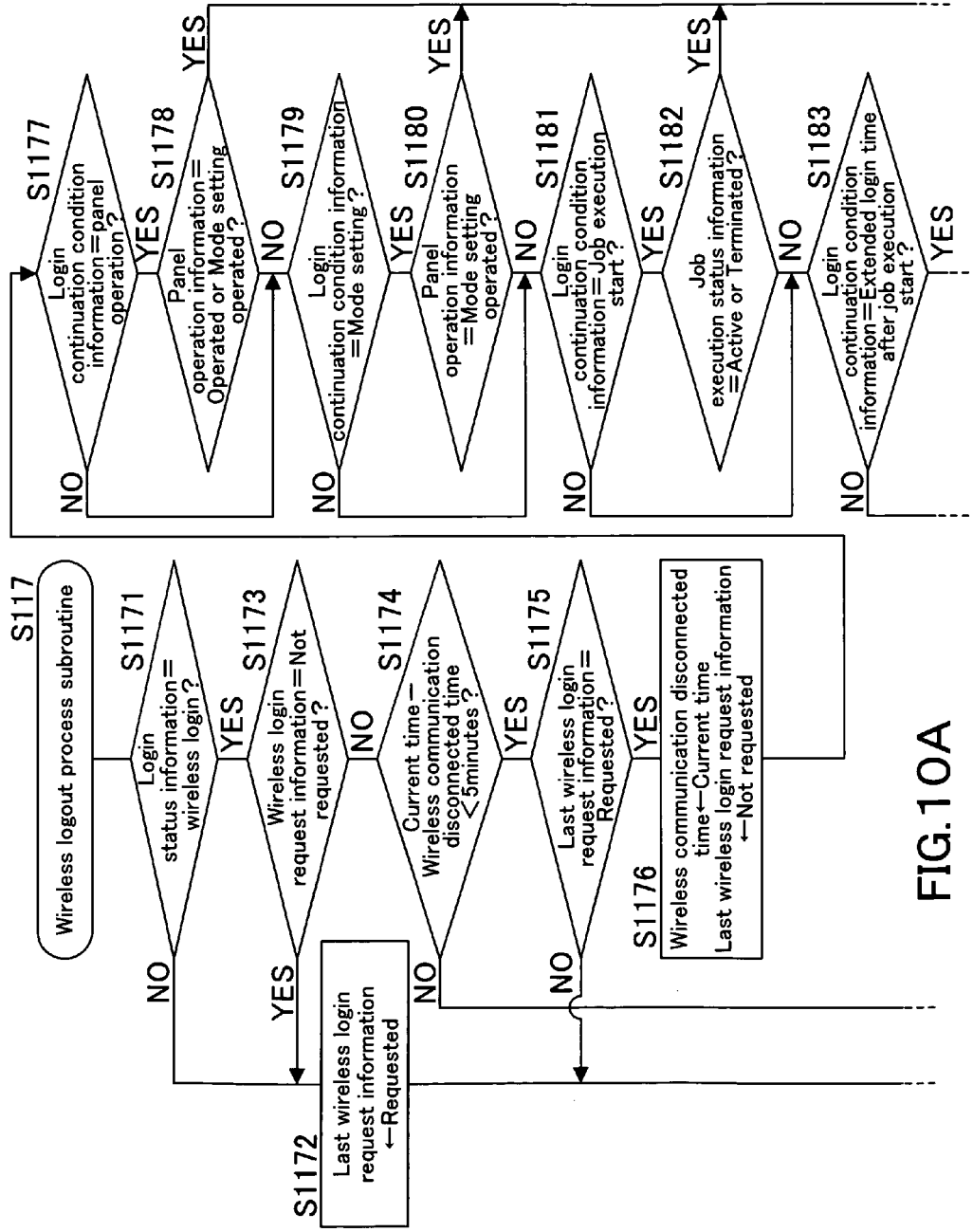

IMAGE PROCESSOR, AN IMAGE PROCESSING SYSTEM, AND A METHOD OF EXECUTING JOBS

This application claims priority under 35 U.S.C. §119 to Japanese Unexamined Patent Publication No. 2005-380468 filed on Dec. 28, 2005, and the disclosure is hereby incorporated by reference in its entirety.

BACKGROUND OF THE INVENTION

1. Field of the Invention

The present invention relates to image processors such as a copier, a printer, a scanner, a facsimile, etc. and an image processing system comprising the image processor, and to a method of executing jobs.

2. Description of the Related Art

The following description sets forth the inventor's knowledge of related art and problems therein and should not be construed as an admission of knowledge in the prior art.

As image processors as described is conventionally available an image processor capable of so-called user authentication that requests input of user information for identifying a person who uses the processor when using it, and that authorizes use of the processor depending on an identified user. In such a case, for example, the following methods are used for entering user information:

a) An automatic input method of transmitting user information held by a wireless terminal to an image processor when the wireless terminal capable of wirelessly communicating with the image processor comes close to the processor, as disclosed in Japanese Unexamined Patent Publication No. 11-149233, and Japanese Unexamined Patent Publication No. 10-16355;

b) An input method by inputting of numeric values or characters, etc from an operation panel;

c) An input method by using biological information such as fingerprints, vein, etc. as user information and sensing this biological information with a sensing device; and d) An input method of reading out user information from a physical key, such as USB (Universal Serial Bus), a card etc., in which the user information is recorded, by connecting it to an image processor.

In the use environment where more than one user shares a same image processor, authentication of user information entered by such input methods enables prevention of inconvenience that image data of one user can be manipulated by other user, generation of billing information for charging cost to each user by managing on a user-by-user basis types or frequency of functions every user uses, control by an administrator to usage of the processor, etc.

In addition, among such image processors there exists an image processor with enhanced user-friendliness by enabling just one device to accept multiple input methods of user information.

However, the various types of user information input methods described above suffer from drawbacks in safety so as to prevent any illegal authentication, as listed below.

a) A user information input method by automatic transmission from a wireless terminal that approaches an image processor Since authentication is done only when a wireless terminal comes close to a processor, even any other user having a wireless terminal who does not intend to use the image processor is also authenticated, which allows the possibility that the other user may directly use the processor.

b) A user information input method by inputting of numeric values or characters, etc. from an operation panel If a password happened to be known to some other person, he/she could be authenticated.

c) A user information input method by sensing biological information such as fingerprints, vein, etc.

Depending on its performance, an authentication system might mistakenly identify some other person as a right person, thus a wrong person might successfully be authenticated.

d) A user information input method by a physical key such as a card or an USB memory, etc., in which user information is recorded.

Depending on a place/method of custody of a physical key, someone else might be able to use the key and authenticated.

Thus, the user information input methods have drawbacks, respectively, and the possibility that an image processor might be illegally used through unlawful authentication cannot be negated. In an image processor which accepts multiple input methods of user information for authentication, in particular, there was the trouble that if other user information input method with lower safety level is used in addition to a user information input method with higher safety level, the former (the user information input method with lower safety level) would cause an illegal user of an image processor and result damage.

In addition, in the user information input method by automatic transmission from the wireless terminal as described in a) above, there was also inconvenience that the login of a user who made automatic login would be terminated, i.e., the user gets logged out, by leaving the image processor for a short time for some reasons during using the device, thus could not do any continuous work.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

It is an object of the present invention to provide an image processor that can obviate any damage from unauthorized use of the image processor which accepts a plurality of different user information input methods, if a user information input method with lower level of safety is used.

It is another object of the invention to provide an image processor, which enables a user do continuous work without login termination when he/she uses the image processor that accepts the user information input method of automatic transmission from a wireless terminal, even if he/she leaves the image processor for a short period of time after automatic login.

It is a further object to provide an image processing system comprising the image processor as described above.

It is a still further object to provide a method of executing jobs in the image processor as described above.

The above objects can be achieved by the disclosures as follows:

A first element of the present invention is an image processor, comprising:
- a user information storage unit for storing information of a plurality of users;
- a plurality of different user information input units for inputting user information;
- a user information matching unit for determining whether or not user information inputted by said respective user information input units matches any of the user information registered in said user information storage unit;
- a job processing unit for executing jobs instructed by a user, whose user information is determined to match any of the registered user information by said user information matching unit; and
- a job processing control unit for restricting jobs that are processed by said job processing unit, depending on which user information input unit is used.

A second element of the present invention is an image processing system, comprising an image processor and wireless terminals that are provided for each user and wirelessly transmit user information to said image processor when enter the wireless communication coverage with respect to the image processor, said image processor comprising:
- a user information storage unit for storing information of a plurality of users;
- a user information input unit comprising a wireless communication unit that not only receives said user information transmitted from said wireless terminals, but also wirelessly communicates with said wireless terminals on a regular basis;
- a user information matching unit for determining whether or not user information inputted by said respective user information input units matches any of the user information registered in said user information storage unit;
- a job processing unit for executing jobs instructed by a user whose user information is determined to match the registered user information by said user information matching unit; and
- a login control unit for permitting the login to allow said job processing unit to execute jobs if said user information matching unit determines that the user information received by said wireless communication unit from the wireless terminal matches any of the user information registered in said user information storage unit, and after login, terminating the login if regular communication between said wireless communication unit and the wireless terminal is failed, and prohibiting the login of other users until a predetermined time has elapsed after the login termination.

A third element of the present invention is an image processing system, comprising an image processor, and wireless terminals that are provided for each user and wirelessly transmit user information to said image processor when enter the wireless communication coverage with respect to the image processor, said image processor comprising:
- a user information storage unit for storing information of a plurality of users;
- a user information input unit comprising a wireless communication unit that not only receives said user information transmitted from said wireless terminals, but also wirelessly communicates with said wireless terminals on a regular basis;
- a user information matching unit for determining whether or not user information inputted by said respective user information input units matches any of the user information registered in said user information storage unit;
- a job processing unit to execute jobs instructed by a user whose user information is determined to match any of the registered user information by said user information matching unit; and
- a login control unit for permitting the login to allow said job processing unit to execute jobs if said user information matching unit determines that the user information received by said wireless communication unit from the wireless terminal matches any of the user information registered in said user information storage unit, and after login, continuing the login under a predetermined login continuation condition if regular communication between said wireless communication unit and the wireless terminal is failed.

A fourth element of the present invention is an image processor comprising:
- a user information storage unit for storing information of a plurality of users;
- a user information input unit comprising a wireless communication unit that not only receives user information transmitted from wireless terminals that perform wireless communication when enter the wireless communication coverage, but also wirelessly communicates with said wireless terminals on a regular basis;
- a user information matching unit for determining whether or not user information inputted by said respective user information input units matches any of the user information registered in said user information storage unit;
- a job processing unit for executing jobs instructed by a user whose user information is determined to match any of the registered user information by said user information matching unit; and
- a login control unit for permitting the login to allow said job processing unit to execute jobs by if said user information matching unit determines that the user information received by said wireless communication unit from the wireless terminal matches any of the user information registered in said user information storage unit, and after login, terminating the login if regular communication between said wireless communication unit and the wireless terminal is failed, and prohibiting the login of other users until a predetermined time has elapsed after the login termination.

A fifth element of the present invention is an image processor comprising:
- a user information storage unit for storing information of a plurality of users;
- a user information input unit comprising a wireless communication unit that not only receives user information transmitted from wireless terminals that perform wireless communication when enter the wireless communication coverage, but also wirelessly communicates with said wireless terminals on a regular basis;
- a user information matching unit for determining whether or not user information inputted by said respective user information input units matches any of the user information registered in said user information storage unit;
- a job processing unit for executing jobs instructed by a user whose user information is determined to match the registered user information by said user information matching unit; and
- a login control unit for permitting the login to allow said job processing unit to execute jobs if said user information matching unit determines the user information received by said wireless communication unit from the wireless terminal matches any of the user information registered in said user information storage unit, and after login, continuing the login under a predetermined login continuation condition if regular communication between said wireless communication unit and the wireless terminal is failed.

A sixth element of the present invention is a method of executing jobs in an image processor capable of executing multiple types of jobs, comprising the steps of:

receiving user information inputted from one of multiple different user information input units;

matching said received user information against the user information registered in the user information storage unit;

setting permission/prohibition on said respective multiple types of jobs depending on which is used to input user information among said multiple user information input units, if said received user information is determined in the matching step, to match any of the user information registered in the user information storage unit; and executing said permitted jobs and/or prohibiting execution of said prohibited jobs.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims

BRIEF DESCRIPTION OF THE DRAWINGS

The preferred embodiments of the present invention are shown by way of example, and not limitation, in the accompanying figures, in which:

FIG. 3 is a flowchart of processes executed at in image processing control unit of MFP.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
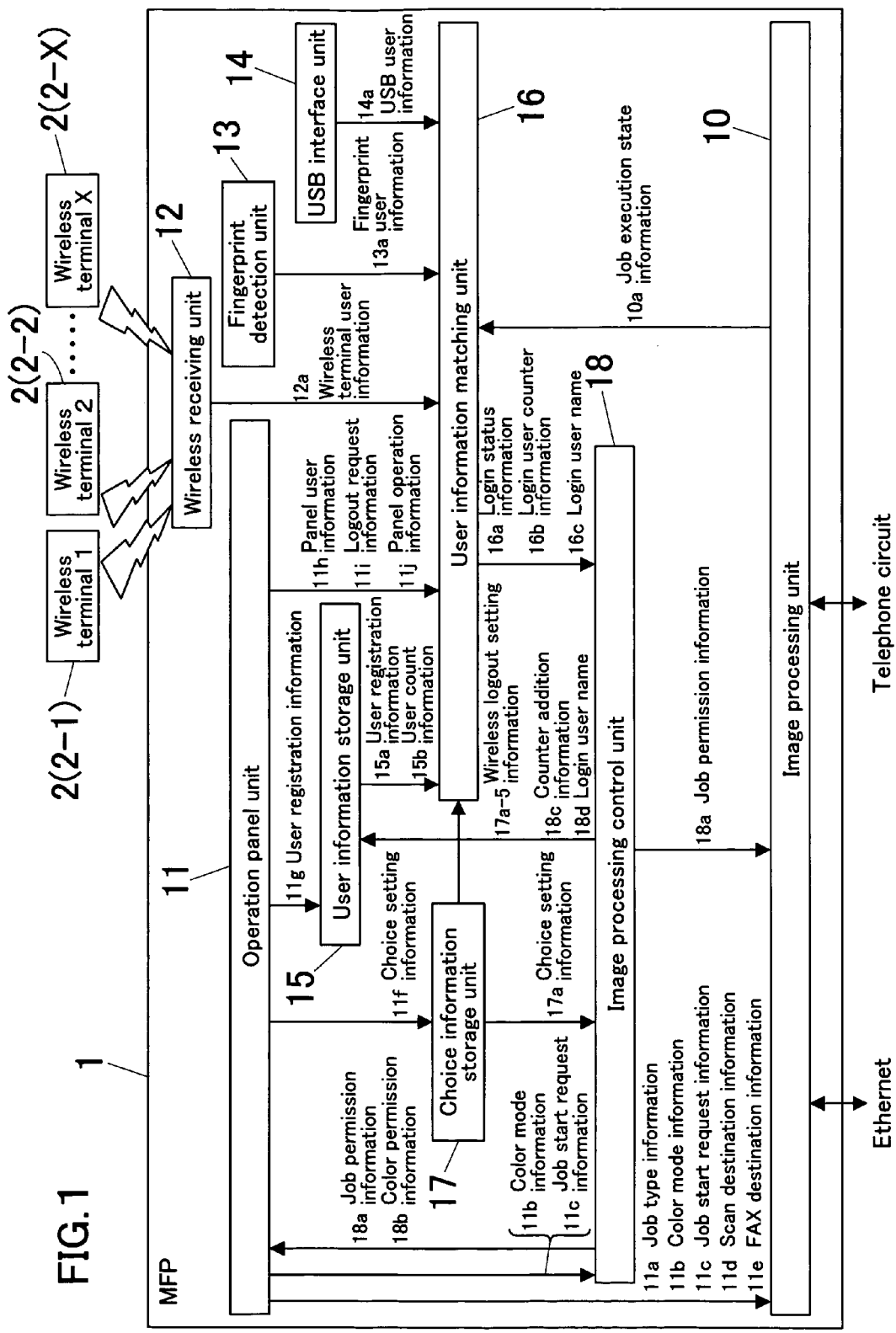
FIG. 1 is a block diagram showing configuration of an image processing system in which an image processor (MFP) is used according to one embodiment of the present invention.

FIG. 1 is a block diagram of an image processing system according to one embodiment of the present invention.

The image processing system is comprised of a MFP (Multi Functional Peripheral) 1 that is a multifunctional complex machine as one example of an image processor, and a plurality of wireless terminals 2 (2-1, 2-2, . . . 2-x).

The said MFP 1 comprises an operation panel unit 11, a wireless receiving unit 12, a fingerprint detection unit 13, an USB (Universal Serial Bus) interface unit 14, a user information storage unit 15, a user information matching unit 16, a choice information storage unit 17, an image processing control unit 18, and an image processing unit 10.

The said operation panel unit 11 functions as one of user information input method, and comprises an LCD screen for displaying various types of information, a touch panel that is provided on an LCD and can accept inputs of alphanumeric strings and settings of variety of information, a START key for instructing execution of a job, and a Logout key for instructing logout.

In response to inputs from the touch panel, etc. by a user or an administrator (a specific user authorized to manage the processor), the operation panel unit 11 generates job type information 11a, color mode information 11b, job start request information 11c, scan destination information 11d, facsimile (hereinafter referred to as FAX) destination information 11e, choice setting information 11f, user registration information 11g, panel user information 11h, logout request information 11i, panel operation information 11j, etc. and transmits them to respective units, as shown in FIG. 1.

Said job type information 11a represents a job type, such as a copy job, a scan job, a FAX transmission job, a PC accumulation print job, a FAX accumulation print job, etc. A user is required to input a job type before pressing START key for job execution.

Said color mode information 11b represents a color mode, and a user is required to specify "Color" or "Monochrome" before pressing START key for job execution. It should be noted that "color" cannot be specified if the job type information is "FAX transmission" or "FAX accumulation print".

Said job start request information 11c represents whether or not there is a job start request.

Said scan destination information 11d represents a destination of image data that is obtained by scanning an original sheet by a scanner unit 101 (shown in FIG. 2), and a user is required to input a destination before execution of scan job.

Said FAX destination information 11e is represents a FAX destination and a user is required to input a destination before execution of fax transmission job.

Said choice setting information 11f is that only an administrator is allowed to input on an image processor, and thus, an administrator is required to input the information earlier than respective users use MFP. The choice setting information 11f includes, for instance, user information input safety setting information, job security level setting information, color security level setting information, upper limit control setting information, wireless logout setting information, etc.

Said user information input safety setting information represents a safety level of "High" or "Low" that is set for each user information input method, and includes panel input safety setting information, wireless input safety setting information, fingerprint input safety setting information, USB input safety setting information, etc., and a safety level should be set for each user information input method.

Said job security level setting information represents a security level that is set for each job, and includes copy security setting information, scan security level setting information, personal computer (PC) print security level setting information, FAX transmission security level setting information, and FAX reception print security level setting information, etc.

Said color security level setting information represents a security level for color printing and color scanning.

Said upper limit control setting information represents an upper limit value of number of job executions, such as maximum number of copies allowed to an user, and includes high security upper limit value information and low security upper limit value information. Only a value smaller than that of the high security upper limit value information can be specified for the low security upper limit value information, Said wireless logout setting information represents a condition to continue user's wireless login, i.e. login continuation condition information. The login continuation condition information includes "Not Continue", "Panel Operation", "Mode Setting", "Job Execution Start" "Extended Login Time after Job Execution Start", "Active Job", "Extended Login Time after Job Termination", etc. Login will be continued with "Panel Operation" when panel operation takes place, "Mode Setting" when a mode is set, "Job Execution Start" when job execution is started, "Extended Login Time After Job Execution Start" for a predetermined time after job execution start, "Executing Job" while a job is being executed, and "Extended Login Time After Job Termination" for a predetermined time after job termination.

Said user registration information 11g is that an administrator should input for each user in advance, and includes a user name and a password.

Said panel user information 11h is that each user who intends to use MFP 1 is required to input for login, and includes panel login request information, panel input user name, panel input password, etc.

In addition, the operation panel unit 11 shall set the logout request information 11i to "Requested" if Logout key is pressed, and to "Not Requested" if the key is not pressed, and then transmits the information to the user information matching unit 16. In addition, the operation panel unit 11 sets the panel operation information 11j to "Mode Setting Operated" when selection of mode, such as a color mode, job type, etc. is operated for a job that is to be executed, and furthermore it sets the panel operation information 11j to "Operated" when some touch panel operation or key input takes place, otherwise sets to "Not Operated", and transmits the information respectively to the user information matching unit 16.

In addition, if both of the following conditions 1 and 2 are satisfied when START key is pressed, the operation panel unit 11 shall set the job start request information 11c to "Requested" and transmits the information to the image processing unit 10 and the image processing control unit 18.

(Condition 1)
The job type information="Copy" AND copy permission information="Permitted";
The job type information="Scan" AND scan permission information="Permitted";
The job type information="FAX transmission" AND FAX transmission permission information="Permitted";
The job type information="PC accumulation print" AND PC print permission information="Permitted"; OR
The job type information="FAX accumulation print" AND FAX reception print permission information="Permitted"

(Condition 2)
The color mode information="Monochrome"; OR
The color mode information="color" AND the color permission information="Permitted"

Said wireless receiving unit 12 shall function as one of the user information input method, and perform wireless communication with the wireless terminal 2. In addition, the wireless terminal 2 comprises at least a recording medium or preferably a portable recording medium that stores user information, and a wireless communication unit that enables exchanging information such as user information out of touch with the wireless receiving unit 12. To be specific, if any of the wireless terminals 2-1, 2-2, . . . 2-x proceeds into a predetermined distance (e.g., 3 meters) from the wireless receiving unit 12 of MFP 1, the wireless receiving unit is enabled to establish wireless communication with said wireless terminal to receive user information (a user name and a password) held by the wireless terminal. After receiving the user information, the wireless receiving unit 12 then transmits wireless terminal user information 12a, which includes wireless login information="Requested" and a received user name and password, to the user information matching unit 16, In addition, the wireless receiving unit 12 shall not only performs communications with the wireless terminal 2 on a regular basis, but also set "Requested" as wireless login request information as long as the communication is enabled, and transmit the information to the user information matching unit 16. While the wireless login request information is "Requested" the wireless receiving unit will ignore any user information if receives from other wireless terminal 2. If the wireless communication is failed for more than a predetermined time (for instance, 1 minute), the wireless receiving unit sets the wireless login request information to "Not Requested" and transmits the information to the user information matching unit 16.

Said fingerprint detection unit 13 is exemplified as a biological information detecting method that detects user specific biological information (information relating to physical features, such as fingerprints or iris at the back of the eye, or voice, etc.), and shall function as one of the user information input methods. To be specific, fingerprint information associated with user names of the users who will use MFP 1 is recorded in advance in the fingerprint detection unit 13. The fingerprint detection unit 13 detects finger information when a user who intends to login MFP 1 places the finger on it. If the detected fingerprint information matches any of the fingerprint information stored in the detection unit, the fingerprint detection unit transmits fingerprint user information 13a, which includes a user name of the user who inputs the fingerprint and the fingerprint login request information="Fingerprint matching OK", to the information matching unit 16.

Said USB interface unit 14 shall send and receive user information when it is connected to (touches) a portable recording medium (it may be a memory card, etc. although it is a USB device in this embodiment) that stores the user information. The USB interface unit 14 shall removably connect to a USB device such as USB memory, etc., by a USB interface, and function as one of the user information input methods. Each user carries with himself/herself a USB device that stores the own user information (a user name and a password). Thus, when a user inserts the USB device into the USB interface unit 14 with intent to use MFP 1, the USB interface unit 14 shall receive the user information.

In addition, the USB user information 14a, which includes USB login request information="Requested" besides the user name and the password received by the USB interface unit 14, is transmitted to the user information matching unit 16.

The user information storage unit 15, which has a nonvolatile memory, shall function as a user information storage method and store the user registration information 11g transmitted from the operation panel unit 11 and information of user counters that count the number of jobs executed by each user. After receiving counter addition information 18c and login user name 18d from the image processing control unit 18, the user information storage unit 15 not only adds to the user counter of the user a value specified by the counter addition information 18c, but also transmits user count information 15b including the added counter value, to the user information matching unit 16.

In addition, the user information storage unit 15 transmits to the user information matching unit 16, the user registration information 11g that is received from the operation panel unit 11 on a regular basis (once every hour for instance), as user registration information 15a.

Said user information matching unit 16 shall perform authentication by matching the user information transmitted from the respective user information input units of the operation panel unit 11, the wireless receiving unit 12, the fingerprint detection unit 13 and the USB interface unit 14 against the user information stored in advance in the user information storage unit 15. To be specific, it works as described below:

[In the case of login from the operation panel unit 11]

Receiving the panel login request information="Requested", then the user information matching unit 16 searches each user's user name and password stored in the user registration information 15a. If there exists a user who matches the user name and the password inputted from a panel, then the user information matching unit 16 authenticates and permits said user to login. Then, the user information matching unit 16 sets "Panel Login" as the login status information 16a, the user name of said user who logged in as the login user name 16c, the value of said user picked up among counter values in the user count information 15b as login user counter information 16b, and transmits the respective information to the image processing control unit 18.

[In the case of login from the wireless unit 12]

Receiving the wireless login request information="Requested", then the user information matching unit 16 searches each user's user name and password stored in the user registration information 15a. If there exists a user who matches the user name and the password inputted from a wireless terminal, then the user information matching unit 16 authenticates and permits said user to login. Then, the user information matching unit 16 sets "Wireless Login" as the login status information 16a, the user name of said user who logged in as the login user name 16c, the value of said user picked up among counter values in the user count information 15b as the login user counter information 16b, and transmits the respective information to the image processing control unit 18.

In addition, if the user information matching unit 16 receives the wireless login request information="Not Requested" when a user is in the login status from the wireless receiving unit 12, it shall terminate the login, set "Logout" as the login status information 16a, and then transmits the information. However, the login will be continued in the following cases while even in these exceptional cases the user information matching unit 16 shall terminate the login when a predetermined time (5 minutes for example) has elapsed after receiving the wireless login request information="Not Requested" set "Logout" to the login status information, and transmit the information.

If the login continuation condition information="Panel Operation" is set in advance and the panel operation information from the operation panel unit 11 is "Operated" or "Mode Set", then the user information matching unit 16 will continue the login.

If the login continuation condition information="Mode Setting" is set in advance and the panel operation information from the operation panel unit 11 is "Mode Set", then the user information matching unit 16 will continue the login.

If the login continuation condition information="Job Execution Start" is set in advance and job execution status information 10a received from the image processing unit 10 is "Active" or "Terminated", then the user information matching unit 16 will continue the login.

If the login continuation condition information="Extended Login Time After Job Execution Start" is set in advance, and the lapse time is so far within a predetermined time (3 minutes for instance) that the job execution status information 10a received from the image processing unit 10, changes from "Unexecuted" or "Terminated" to "Active", then the user information matching unit 16 will continue the login.

If the login continuation condition information="Active Job" is set in advance and the job execution status information 10a received from the image processing unit 10 is "Active", then the user information matching unit 16 will continue the login.

If the login continuation condition information="Extended Login Time After Job Termination" is set in advance, and the lapse time is so far within a predetermined time (3 minutes for instance) after the job execution information status information 10 received from the image processing unit 10, changes from "Active" to "Terminated", then the user information matching unit 16 will continue the login.

In addition, the user information matching unit 16 shall not accept login from any other user within a predetermined time (2 minutes for instance) even after said login is terminated (it shall not accept login by any of the user information input methods other than wireless input, either).

[In case of the login from the fingerprint detection unit 13]

Receiving the fingerprint login information="Fingerprint Matching OK", then the user information matching unit 16 searches each user's user name stored in the user registration information 15a. If there exists any user who matches the user name inputted by fingerprint, then the user information matching unit authenticates and permits said user to login. Then, the user information matching unit 16 sets "Fingerprint Login" as the login status information 16a, the user name of said user who logged in as the login user name 16c, and the value of said user picked up among counter values in the user count information 15b as the login user counter information 16b, and transmit the respective information the image processing control unit 18.

[In the case of login from the USB interface unit 14]

Receiving the USB login request information="Requested", then the user information matching unit 16 searches each user's user name and password stored in the user registration information 15a. If there exists any user who matches the user name and the password inputted by USB device, then the user information matching unit 16 authenticates and permits said user to login. Then, the user information matching unit 16 sets "USB Login" as the login status information 16a, the user name of said user who logged in as the login user name 16c, the value of said user picked up among counter values in the user count information 15b, and transmits respective information to the image processing control unit 18.

In addition, if any user has already logged in, other users are prohibited to login, no matter any input method is used for login (if any user is already in the login status by an input method, no login request of other users is accepted and no login is permitted by any input method).

In addition, if the logout request information 11i="Requested" is received from the operation panel unit 11, or, if no user is in the login status, then the user information matching unit 16 recognizes the logout, sets "Logout" as the login status information 16a, and transmits the information to the image processing control unit 18.

Said choice information storage unit 17, which has a non-volatile memory, shall store the choice setting information 11f received from the operation panel unit 11, and transmits it to the information processing control unit 18 as the choice setting information 17a. As for the wireless logout setting information, which is included in the choice setting information 11f, the choice information storage unit 17 transmits it to the user information matching unit 16 at the same time.

Said information processing control unit 18 shall determine whether or not to permit a user to execute various types of jobs based on the login status information 16a, the login user counter information 16b and the login user name 16c, which are transmitted from said user information matching unit 16, and the choice setting information 11f stored in the choice setting storage unit 17, and control the image processing unit 10. In other words, the image processing control unit 17 shall function as a job processing control method and a login control method. In addition, the image processing control unit 18 creates job permission information 18a and color permission information 18b, and transmits the information to the operation panel unit 11. As for the job permission information 18a, the image processing control unit 18 transmits it to the image processing unit 10 at the same time. The job permission information 18a includes copy permission information, scan permission information, PC print permission information, FAX transmission permission information, FAX reception permission information, etc.

In addition, the image processing control unit 17 recognizes that job execution is started when receives the job start request information 11c="Requested" from the operation panel unit 11, and transmits counter addition information 18c and login user name 18d to the user information storage unit 15.

A login user name received from the user information matching unit 16, i.e., a user name of the user who logged in and gave an instruction to execute the job, is set as the login user name 18d.

In addition, if the color mode information 11b="Monochrome", the counter addition information 18c is set to "1", and if the color mode information 11b="Color", it is set to "2".

In addition, the set value as the counter addition information mentioned above is just one example, wherein the upper limit number of color mode job executions of each user is limited to half of that of monochrome mode job executions (since the counter value is added by +2, the upper limit value will be reached with half of the number of color mode job executions) because of rather high costs for a color mode job.

Figure 2:
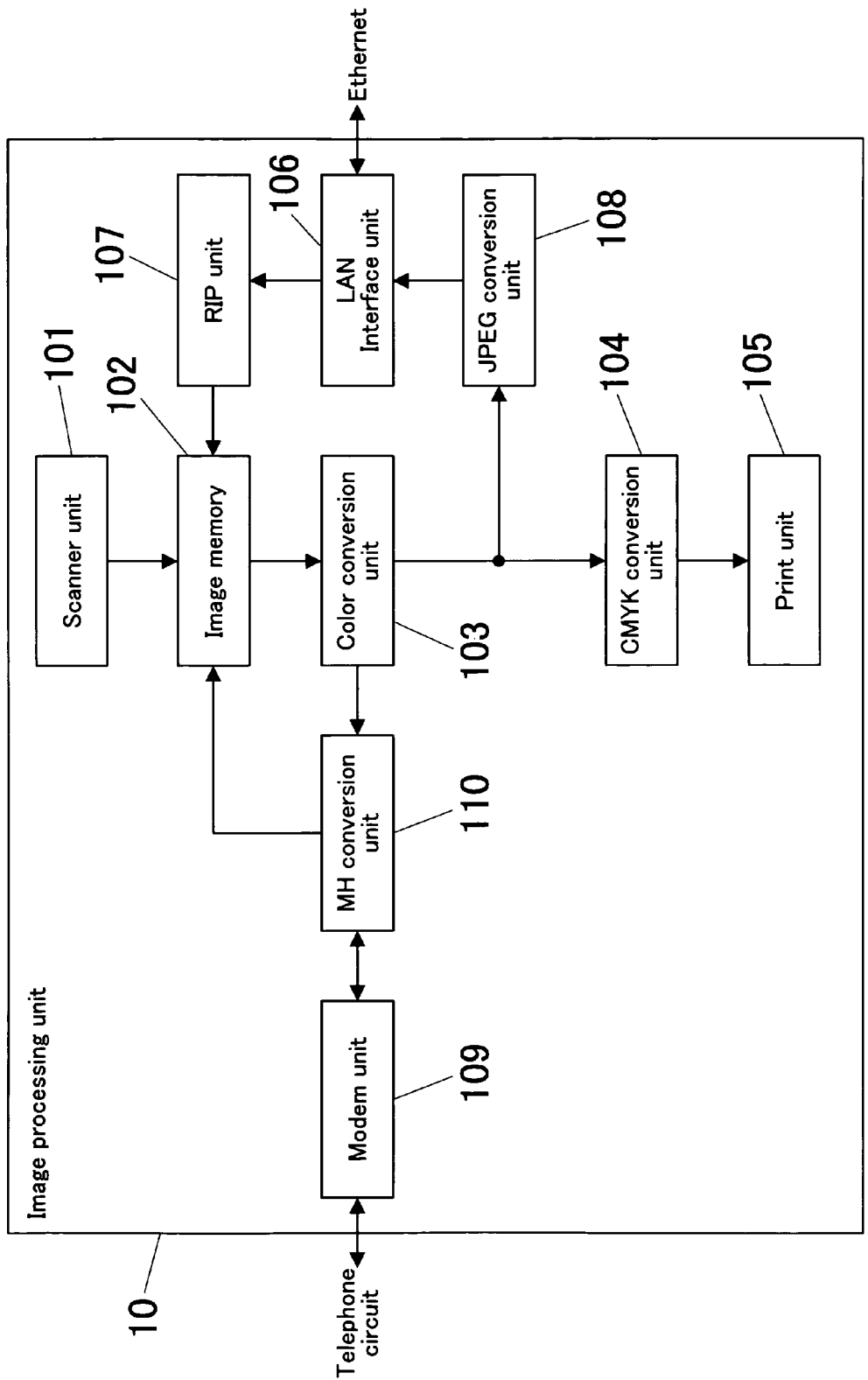
FIG. 2 is a block diagram showing configuration of an image processing unit of MFP.

Said image processing unit 10 shall function as one of the job processing methods. The image processing unit 10 executes jobs when receives information from the operation panel unit 11 and the image processing control unit 18, and image data from Ethernet or telephone circuits, FIG. 2 shows configuration of the image processing unit 10. The image processing unit 10 comprises a scanner unit 101, an image memory unit 102, a color conversion unit 103, a CMYK conversion unit 104, a print unit 105, a LAN interface unit 106, a RIP unit 107, a JPEG conversion unit 108, a modem unit 109, and MH conversion unit 110.

Said scanner unit 101 converts the optical information, which is obtained by optically scanning an original sheet, into color RGB image data by CCD, and transmits the data to the image memory unit 102.

Said image memory unit 102 stores color or monochrome RGB image data.

If the monochrome mode is set on the color conversion unit 103 and color RGB image data is received from the image memory unit 102, the color conversion unit 13 converts the received color RGB image data into monochrome RGB image data. On the one hand, if "Color" is set, the color conversion unit 13 outputs the color RGB image data, which is received from the image memory unit 102, directly as is.

Said CMYK conversion unit 104 converts the RGB image data received from the color conversion unit 103 into CMYK image data, and transmits the data to the print unit 105.

Said print unit 105 prints the CMYK image data transmitted from the CMYK conversion unit 104 onto a sheet according to the electrographic printing processes.

Said LAN interface unit 106 is connected to an external PC, etc., through Ethernet. Receiving from an external PC image data in the page-description language format such as PS (Post Script), PCL (Printer Control Language), etc., then the LAN interface unit 106 transmits the data to the RIP unit 107. In addition, when receives JPEG image data from the JPEG conversion unit 108, then the LAN interface unit 106 transmits the data to the external PC through Ethernet.

Receiving image data in the page description language format from the LAN interface unit 106, then said RIP unit 107 RIP-develops the data into raster data, and transmits it to the image memory unit 102 as RGB image data.

Said JPEG conversion unit 108 compresses the RGB image data received from the color conversion unit 103 to convert it into JPEG image data, and transmits the data to the LAN interface unit 106.

Said modem unit 109 is connected to telephone circuits. Receiving FAX image data in the MH format, then the modem unit 109 transmits the data to the MH conversion unit 110. In addition, when receives MH image data from the MH conversion unit 110, then the modem unit 109 transmits the data to an external FAX machine through telephone circuit.

Receiving RGB image data from the color conversion unit 103, then said MH conversion unit 110 converts it into image data in the MH (Modified Huffman encoding) format, and transmits the data to the modem unit 109. In addition, when receives MH image data from the modem unit 109, then the MH conversion unit converts it into RGB image data, and transmits the data to the image memory unit 102.

To be specific, the image processing unit 10 executes a job in the way as described below:

The image processing unit 10 executes a copy job, if the job type information 11a received from the operation panel unit 11="Copy" and the job start request information 11c="Requested". In addition, it executes a scan job, if the job type information 11a="Scan" and the job start request information 11c="Requested".

The image processing unit 10 executes a FAX transmission job, if the job type information 11a="FAX transmission" and the job start request information 11c="Requested". In addition, it executes a PC print job, if the PC print permission information, one of the job permission information 18a, ="Permitted" is received from the image processing control unit 18 and image data is received from an external through Ethernet.

Similarly, the image processing unit 10 executes a FAX reception print job, if the FAX reception print permission information, one of the job permission information 18a, ="Permitted" is received and image data is received by FAX through telephone circuits. In addition, it executes a PC print accumulation job, if the PC print permission information="Prohibited" is received and image data is received from an external PC through Ethernet.

In addition, the image processing unit 10 executes a FAX reception accumulation job, if the FAX reception print permission information="Prohibited" is received and image data is received by FAX through telephone circuits.

In addition, the image processing unit 10 executes a PC accumulation print job, if the job type information 11a="PC accumulation print" and the job start request information 11c="Requested", while it executes a FAX accumulation print job, if the job type information 11a="FAX accumulation print" and the job type request information 11c="Requested".

Here below described are summary about the respective jobs and flow of image data during execution of respective jobs.

1) Copy Job

This is a job to print onto a sheet an image obtained by scanning an original sheet. The mage data is transmitted in the route of the scanner unit 101→the image memory unit 102→the color conversion unit 103→the CMYK conversion unit 104→the print unit 105.

2) Scan Job

This is a job to transmit to an external PC through Ethernet, an image obtained by scanning an original sheet. The image data is transmitted in the route of the scanner unit 101→the image memory unit 102→the color conversion unit 103→the JPEG conversion unit 108→the LAN interface unit 106→the external PC.

3) PC Print Job

This is a job to print onto a sheet an image received from an external PC through Ethernet. The image data is transmitted in the route of the external PC→the LAN interface unit 106→the RIP unit 107→the image memory unit 102→the color conversion unit 103→the CMYK conversion unit 104→the print unit 105.

4) FAX Transmission Job

This is a job to transmit by FAX an image obtained by scanning a copy. The image data is transmitted in the route of the scanner unit 101→the image memory unit 102→the color conversion unit 103→the MH conversion unit 110→the modem unit 109→the telephone circuits.

5) FAX Reception Print Job

This is a job to print onto a sheet an image received by FAX. The image data is received over telephone circuits, and is transmitted in the route of the modem unit 109→the MH conversion unit 110→the image memory unit 102→the color conversion unit 103→CMYK conversion unit 104→the print unit 105.

6) PC Print Accumulation Job

This is a job to accumulate in the image memory an image received from an external PC through Ethernet. The image data is transmitted in the route of the external PC→the LAN interface unit 106→the RIP unit 107→the Image memory unit 102.

7) FAX Reception Accumulation Job

This is a job to accumulate into the image memory an image received by FAX. The image data is received over telephone circuits, and is transmitted in the route of the modem unit 109→the MH conversion unit 110→the image memory unit 102.

8) PC Accumulation Print Job

This is a job to print an image of the job accumulated as the PC print accumulation job in the image memory unit 102. The image data is transmitted in the route of the image memory unit 102→the color conversion unit 103→the CMYK conversion unit 104→the print unit 105.

9) FAX Accumulation Print Job

This is a job to print an image of the job accumulated as the FAX reception accumulation job in the image memory 102. The image data is transmitted in the route of the image memory unit 102→the color conversion unit 103→the CMYK conversion unit 104→the print unit 105.

In the above, respective jobs are executed in the mode specified by the color mode information 11b. In addition, when a scan job is executed, image is transmitted to an external PC specified by the scan destination information 11d. In addition, when a FAX transmission job is executed, image is transmitted to an external FAX machine specified by the FAX destination information 11e.

In addition, the image processing unit 10 sets the job execution status information 10a as described below, and transmits the set information to the user information matching unit 16. The job execution status information 10a is set to "Unexecuted" when job execution is not started yet, "Active" while some job is being executed, and set to "Terminated" as soon as job execution is terminated.

Said wireless terminal 2 is provided for a user and holds user information of the user. The wireless terminal 2 wirelessly transmits user information (a user name and a password) in cycles of predetermined duration (e.g., 10 seconds). Besides the method in which the wireless terminal 2 autonomously transmits user information in cycles of predetermined duration in the present embodiment, the wireless terminal 2 may be configured so as to receive an inquiry from MFP 1 in cycles of predetermined duration and send back user information in response to the inquiry.

In the following, processes executed by the image processing control unit 18 of MFP 1 as shown in FIG. 1 and FIG. 2, are explained with reference to the flowcharts of FIG. 3 and FIG. 4.

In FIG. 3, the image processing control unit 18 determines in Step S001, whether or not the login status information 16a sent from the user information matching unit 16 is "Logout".

If the login status information 16a is "Logout" (YES in Step S001), then the process proceeds to step S024, in which the image processing control unit 18 not only sets to "Prohibited", all the job permission information 18a of the copy permission information, the scan permission information, the PC print permission information, the FAX transmission permission information, the FAX reception print permission information, etc., but also sets to "Prohibited" the color permission information 18b. Then, the process proceeds to step S025 in FIG. 4, that is, the image processing control unit 18 lets the user logout.

In Step S001, if the login status information 16a is not "Logout" (NO in Step S001), the login status information 16a should be "Panel Login", "Wireless Login", "Fingerprint Login", or "USB Login", and thus in Step S002, the image processing control unit 18 refers to the safety setting information that is set in advance as the choice setting information for each login method. Then, if the safety setting information is set as "High", the process proceeds to step S003. If the safety setting information is set as "Low", the process proceeds to step S005.

In Step S003, the image processing control unit 18 checks whether or not a value of the login counter information 16b transmitted from the user information matching unit 16 is lower than that of the high security upper limit value information that is set in advance. If it is lower (YES in Step S003), there should remain some number of job executions permitted for the user. Thus, in order to permit the user to execute a job, the process proceeds to step S004, where the image processing control unit not only set to "Permitted", all the job permission information 18a of the copy permission information, the scan permission information, the PC print permission information, the FAX transmission permission information, the FAX reception print permission information, etc., but also set to "Permitted" the color permission information 18b. Then, the process proceeds to step S025 in FIG. 4. In this way, the image processing control unit 18 permits a user to execute a job with ensured high safety.

In Step S003, if a value of the login counter information 16b transmitted from the user information matching unit 16, reaches that of the high security upper limit value information that is set in advance (NO in Step S003), then the process proceeds to step S024, in which the image processing control unit 18 not only sets to "Prohibited" all the job permission information 18a, but also set to "Prohibited" the color permission information 18b, in order to prohibit the user to execute a job. Then, the process proceeds to step S025 in FIG. 4.

On the one hand, in Step S005, the image processing control unit checks whether or not a value of the login counter information 16b is lower than that of the low security upper limit value information that is set in advance. If so (YES in Step S005), there should remain some number of job executions permitted for the user, then the process proceeds to step S006 in which it is determined whether or not the copy security level setting information set in advance is "Low".

If the copy security level setting information is "Low" (YES in Step S006), the image processing control unit 18 sets the copy permission information to "Permitted" in Step S007, and the process proceeds to step S009.

If the copy security level setting information is not "Low" in other words, if it is "High" (NO in Step S006), the image processing control unit 18 sets the copy permission information to "Prohibited" in Step S008 in order to ensure security, and the process proceeds to step S009.

In Step S009, it is determined whether or not the scan security level setting information set in advance is "Low". If the scan security level setting information is "Low" (YES in Step S009), the image processing control unit 18 sets the scan permission information to "Permitted" in Step S010, and the process proceeds to step S012.

If the scan security level setting information is not "Low" (NO in Step S009), the image processing control unit 18 sets the scan permission information to "Prohibited" in Step S011 in order to ensure security, and the process proceeds to step S012.

In Step S012, it is determined whether or not the PC print security level setting information set in advance is "Low". If the PC print security level setting information is "Low" (YES in Step S012), the PC print permission information is set to "Permitted" in Step S013, and the process proceeds to step S015.

If the PC print security level setting information is not "Low" (NO in Step S012), the PC print permission information is set to "Prohibited" in Step S014 in order to ensure security, and the process proceeds to step S015.

In Step S015, it is determined whether or not the FAX transmission security level setting information set in advance is "Low". If the FAX transmission security level setting information is set to "Low" (YES in Step S015), the FAX transmission permission information is set to "Permitted" in Step S016, and the process proceeds to step S018.

If the FAX transmission security level setting information is not "Low" (NO in Step S015), the FAX transmission permission information is set to "Prohibited" in order to ensure security in Step S017, and the process proceeds to step S018.

In Step S018, it is determined whether or not the FAX reception print security level setting information set in advance is "Low". If the FAX reception print security level setting information is "Low" (YES in Step S018), the FAX transmission print permission information is set to "Permitted" in Step S019, and the process proceeds to step S021.

If the FAX reception print security level setting information is not "Low" (NO in Step S018), the FAX reception print permission information is set to "Prohibited" in order to ensure security in Step S020, and the process proceeds to step S021.

In Step S021, it is determined whether or not the color security level setting information set in advance is "Low". If the color security level setting information is set to "Low" (YES in Step S021), the color permission information is set to "Permitted" in Step S022, and the process proceeds to step S025.

If the color security level setting information is not "Low" (NO in Step S021), the color permission information is set to "Prohibited" in order to ensure security in Step S023, and the process proceeds to step S025.

Thus, since a user is permitted to execute a job depending on the permission information set for each job, user friendliness can improved with ensured security.

Figure 4:
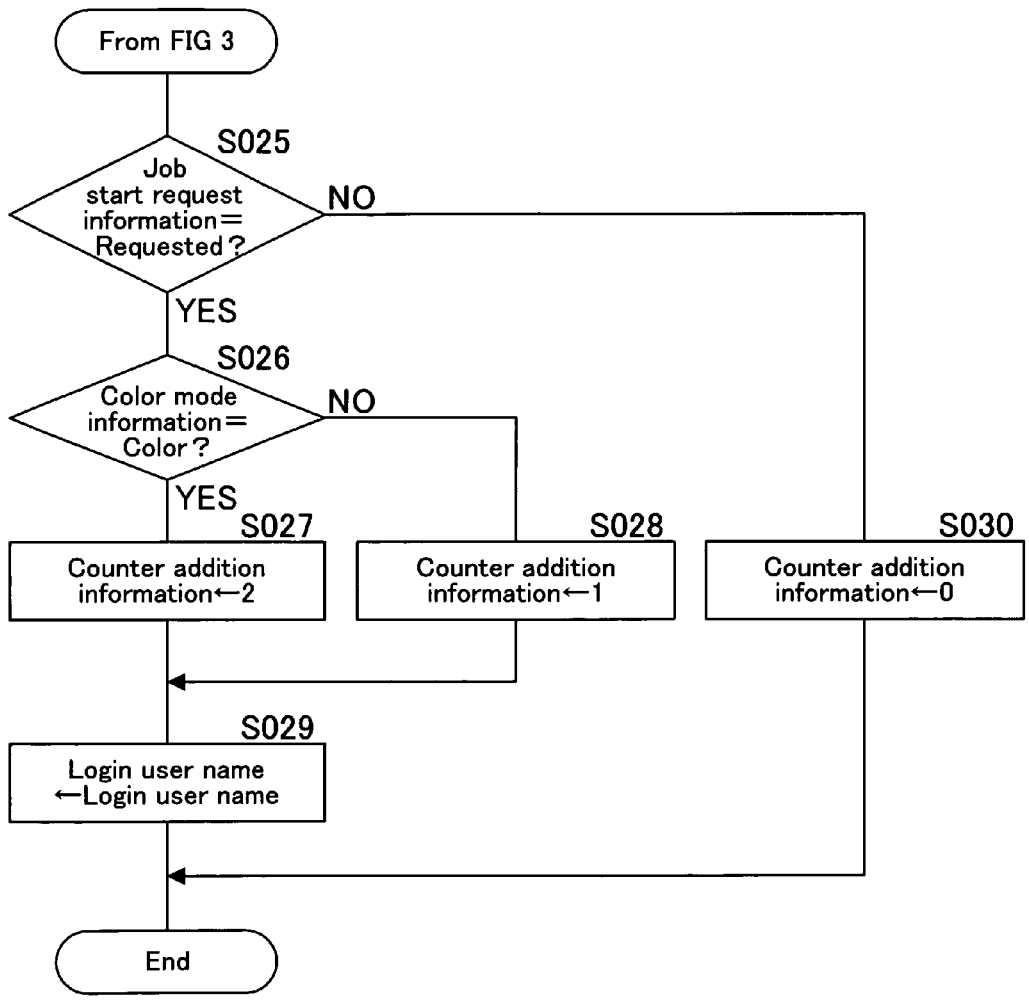
FIG. 4 is a flowchart continued from FIG. 3.

Then, in Step S025 in FIG. 4, it is determined whether or not the job start request information 11c transmitted from the operation panel unit 11 is "Requested". If it is not "Requested" (NO in Step S025), a value of the counter addition information 18c to be transmitted to the user information storage unit 15 is set to "0" in Step S30, and the process terminates.

If the job start request information 11c is "Requested" (YES in step S025), it is then determined in Step S026, whether of not the color mode information 11b transmitted from the operation panel 11 is "Color". If it is "Color" (YES in Step S026), a value of the counter addition information 18c is set to "2" in Step S027, and the process proceeds to Step S029. If it is not "Color", that is, if it is "Monochrome" (NO in Step S026), a value of the counter addition information 18c is set to "1" in Step S028, and the process proceeds to Step S029.

In Step S029, a name of the user who is now in login status is set to the login user name 18b, which is to be transmitted to the user information storage unit 15, and the process terminates.

In this way, the job permission information 18a, the color permission information 18b, the counter addition information 18c, and the login user name 18d are set accordingly in the processes, and the respective information is transmitted only to the unit(s), such as the image processing unit 10, etc., that needs the information.

After receiving the job permission information 18a, the image processing unit 10 executes or prohibits a job based on the job permission information 18a, besides the job type information 11a, the color mode information 11b, the job start request information 11c, the scan destination information 11d, and the FAX destination information 11e that are transmitted from the operation panel unit 11.

In addition, in the embodiment as shown in FIG. 3, if the copy security level setting information is set "High" under conditions where the wireless input safety setting information is "Low" and the other input safety information are "High", then a user who logins from the wireless terminal 2 can be prohibited to execute a copy job.

In other words, the determination would be NO in Step S002 and definitely NO in Step S006 even if YES in Step S005, thus the copy permission information is set to "Prohibited" in Step S008 to prohibit a copy job for a user who login from the wireless terminal 2.

Similarly, if each of the scan security level setting information, the PC print security level setting information, the FAX transmission security level setting information, the Fax reception print security level setting information and the color security level setting information is set to "High", a scan job, a PC print job, a FAX transmission job, a FAX reception print job, and a color print/copy job can be prohibited for a user who logins from the wireless terminal 2.

In addition, similarly, if the panel input safety setting information is set to "Low" and the security level setting information of a particular job is set to "High", that job can be prohibited for a user who logins from the operation panel unit 11.

In addition, if the wireless input safety setting information and the panel input safety setting information are set to "High" and the fingerprint input safety setting information and the USB input safety setting information are set to "Low", the number of job executions is limited to the value specified in the low security upper limit value information (Step S005 in FIG. 3), for a user who logins from the wireless terminal 2 or the operation panel 11. That is, since it is lower than the value specified in the high security upper limit value information (Step S003 in FIG. 3), the number of job executions can be limited for a user who logins by wireless or panel operation in preference to a user who logins by fingerprint or USB.

Thus, prohibition of a particular job or limitation of number of job executions against a user who logins from the wireless terminal 2 or the operation panel unit 11, would provide the following advantages.

That is, when user information is transmitted from the wireless terminal 2, depending on the reception sensitivity or fluctuations of wireless communications, MFP 1 may become usable even though the wireless terminal 2 does not come so close to MFP 1. This means other person could have a chance to use MFP 1 illegally if a user just comes close to MFP 1 even without intention to use it. So, it can be said that user information input from the wireless terminal 2 has relatively low safety. In addition, it can be also said that user information input from the operation panel 11 has relatively low safety, because there is a risk of illegal use of MFP 1 if other person happened to know the user information stored in MFP 1.

On the one hand, login by detecting the biological information specific to user such as fingerprints, etc., has relatively high safety because of no negative safety factors as described above in cases of login from the wireless terminal 2 or the operation panel unit 11. In addition, in case of login by using a USB device, it is not possible for other person to use MFP 1 illegally under conditions where device storage is strictly managed. Thus, it can be said that safety is relatively high.

Thus, it is possible to obviate any damage due to unauthorized use, by prohibition of a job or limitation of number of job executions, for a user who logins from the wireless terminal 2 or the operation panel unit 11 of which safety is relatively low.

In such cases, types of job do not have to be limited particularly for prohibition, although, if a copy job or a PC print job is prohibited, it is an advantage to save the unnecessary costs for consumption of print sheets and toner due to unauthorized use in electromyography process, etc.

It is another advantage to save the unnecessary costs for communication due to unauthorized use, if a scan job or a FAX transmission job is prohibited.

It is still another advantage to save the unnecessary costs for consumption of sheets and toner due to unauthorized use, if color printing/copying is prohibited.

User information input methods by which a job is prohibited or the number of job executions is limited, and types of job to be prohibited, do not have to be limited to the embodiment above, but can be set as appropriate depending on the use environment, etc. A permitted/prohibited job is determined by input safety setting information set for each user information input method in this embodiment, although, that may be determined simply by user information input method.

In the following, the processing by the user information matching unit 16 is described in reference to the flowcharts of FIG. 5 to FIG. 10. The processes are executed in cycles of predetermined duration (for example, 10 minutes).

It is first checked in Step S101 whether or not a gap between the current time and the wireless logout time exceeds 2 minutes. The current time refers to the time of day when the process is executed, and is determined by clock function provided in the user information matching unit 16.

If the gap between the current time and the wireless logout time does not exceed 2 minutes (NO in Step S101), the process proceeds to step S110.

If the gap between the current time and the wireless logout time is greater than 2 minutes (YES in Step S102), it is checked in Step S102, whether or not the login status information 16*a* is "Logout". If it is "Logout" (YES in Step S102), the process proceeds to step S103, and if it is not "Logout (NO in Step S102), the process proceeds to step 104.

In the step S103, after the subroutine of the panel login process is executed, the process proceeds to step S104. The subroutine of the panel login process will be described later.

In Step S204, it is checked whether or not the login status information 16*a* is "Logout". If it is "Logout" (YES in Step S104), the process proceeds to step S105, and if it is not "Logout" (NO in Step S104), the process proceeds to step S106.

In Step S105, after the subroutine of the wireless login process is executed, the process proceeds to step S106. The subroutine of the wireless login process will be described later.

In Step S106, it is checked whether or not the login status information 16*a* is "Logout". If it is "Logout" (YES in Step S106) the process proceeds to step S107, and if it is not "Logout" (NO in Step S106), the process proceeds to step S108.

In Step S107, after the subroutine of the fingerprint login process is executed, the process proceeds to step S108. The subroutine of the fingerprint login process will be described later.

In Step S108, it is checked whether or not the login status information 16*a* is "Logout" If it is "Logout" (YES in Step S108), the process proceeds to step 109. If it is not "Logout" (NO in Step S108), the process proceeds to step S110.

In Step S109, after the subroutine of the USB login process is executed, the process proceeds to step S110. The subroutine of the USB login process will be described later.

In Step S110, it is determined whether the last job execution status information 10*a* is "Unexecuted" or "Terminated" OR NOT of the both. If it is neither "Unexecuted" nor "Terminated" (NO in Step S110), the process proceeds to step S113, and if it is either "Unexecuted" or "Terminated" (YES at the step 110), the process proceeds to step S111.

In Step S111, it is checked whether or not the job execution status information 10a is "Active". If it is not "Active" (NO in Step S111), the process proceeds to step S113. If it is "Active" (YES in Step S111), the process proceeds to step S113 after the current time is set as job start time in Step S112.

In Step S113, it is determined whether or not the last job execution status information 10a is "Active". If it is not "Active" (NO in Step S113), the process proceeds to step S116. If it is "Active" (YES in Step S113), then it is determined in Step S114 whether or not the job execution status information 10a is "Terminated", and if it is not "Terminated" (NO in Step S114), the process proceeds to step S116, and if it is "Terminated" (YES in Step S114), the process proceeds to Step S115. In Step S115, after the current time is set as the job termination time, the process proceeds to step S116.

In Step S116, after the current job execution status is set as the last job execution status information 10a, the subroutine of the wireless logout process is executed in Step S117, and then the process proceeds to Step S118. The subroutine of the wireless logout process will be described later.

In Step S118, it is determined whether or not the logout request information 11i is "Requested". If it is not "Requested" (NO in Step S118), the process terminates. If it is "Requested" (YES at the step S118), the login status information 16a is set to "Logout" in Step S119 and the process terminates.

Figure 5:
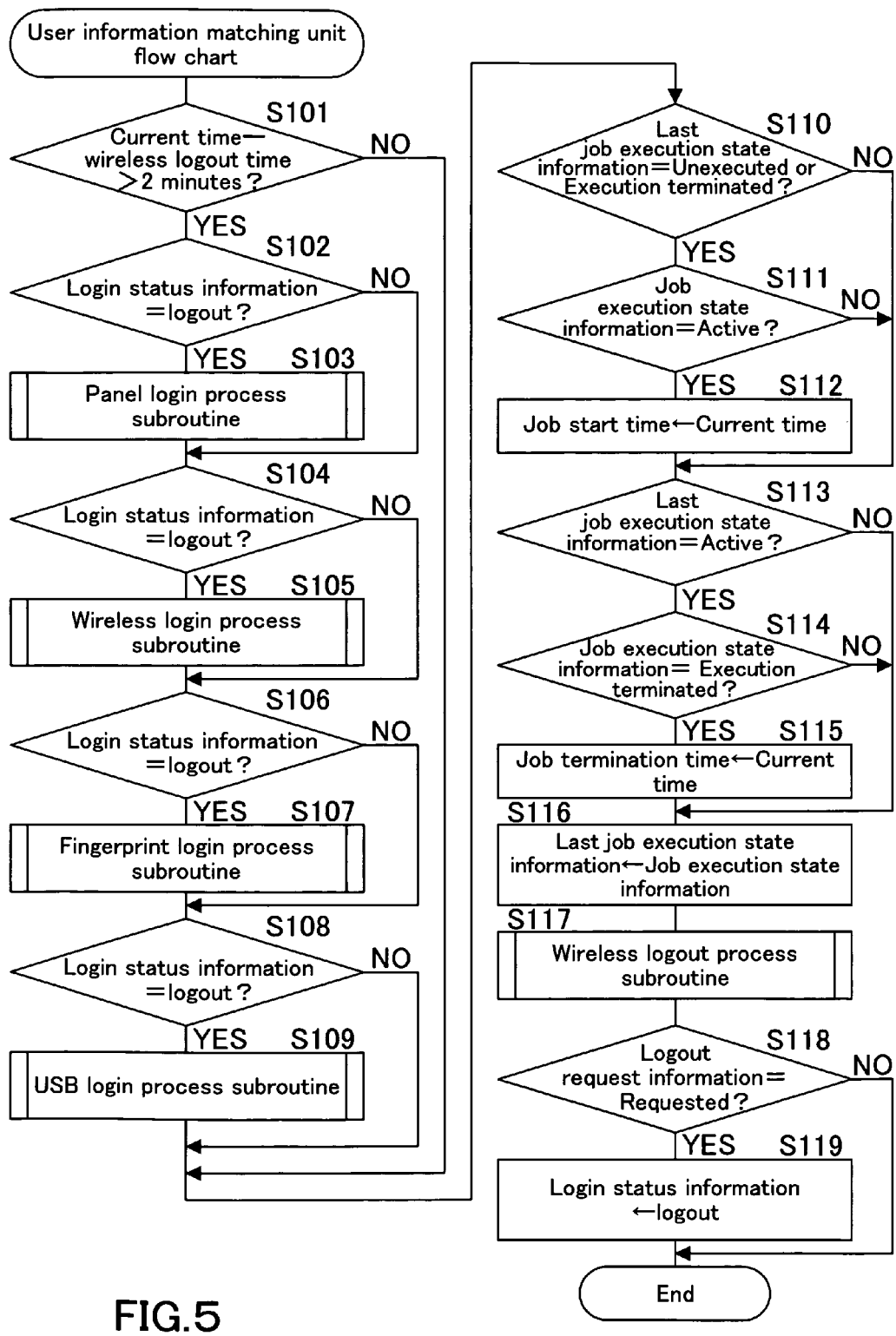
FIG. 5 is a flowchart of processes executed in a user information matching unit of MFP.
Figure 6:
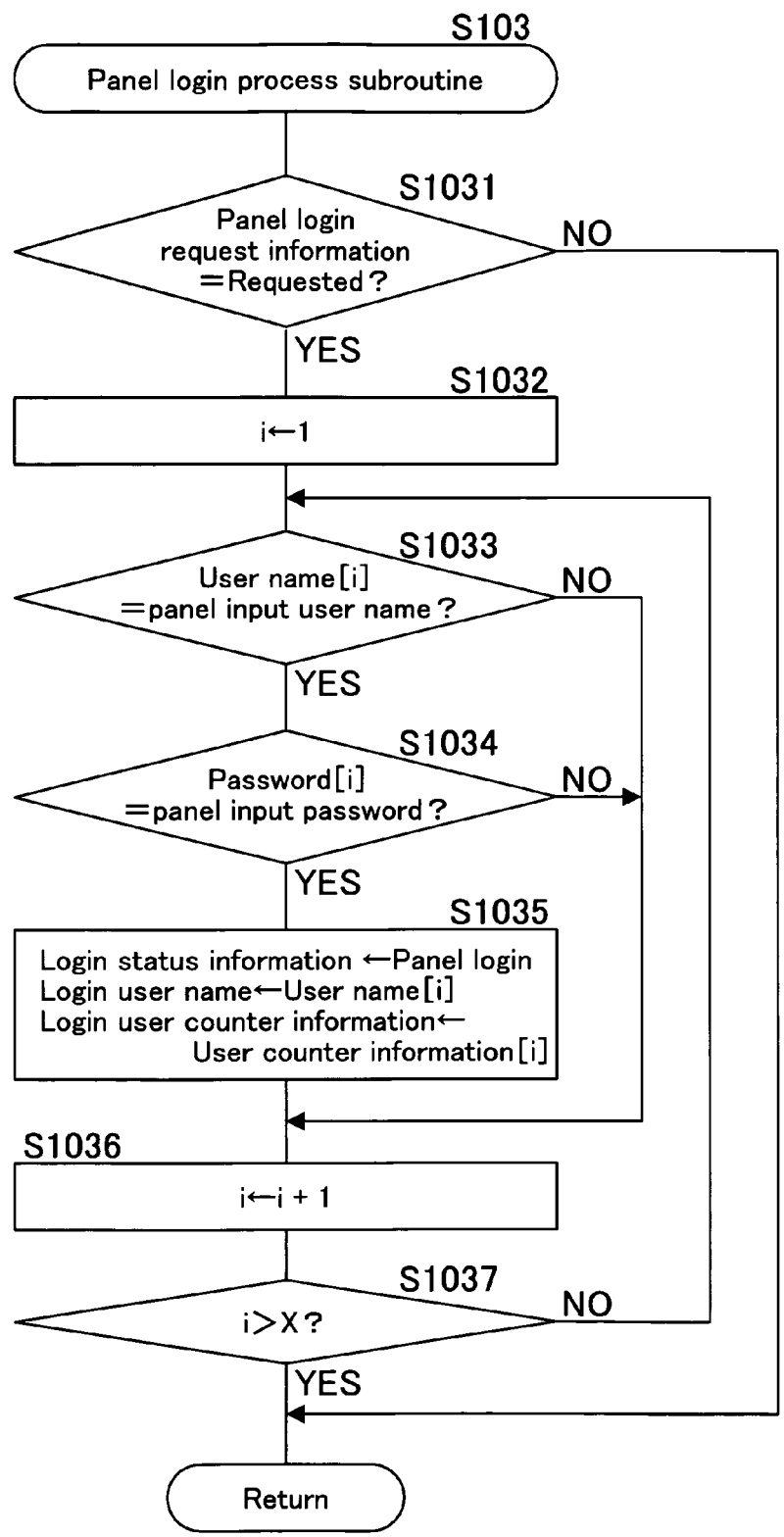
FIG. 6 is a flowchart showing a subroutine of panel login process of FIG. 5.

FIG. 6 is a flowchart showing the subroutine of the panel login process (Step S103) of FIG. 5.

In Step S1031, it is checked whether of not the panel login request information, which is one of the panel user information 11h, is "Requested". If it is not "Requested" (NO in Step S1031), then the process directly returns.

If the panel login request information is "Requested" (YES in Step S1031), then it is checked if there is any that matches the user name inputted from the operation panel, in order among the user information stored in the user information storage unit 15.

In other words, after "1" is set to the variable i in Step S1032, it is determined whether or not a first listed user name in the user information storage unit 15 matches the user name inputted from the operation panel in Step S1033. If so (YES in Step S1033), it is determined similarly in Step S1034 whether or not the passwords match each other.

If the user names or the passwords do not match (NO in Step S1033 or NO in Step S1034), the process proceeds to step S1036, where "2" is set to the variable i. Then, it is checked whether or not any of the subsequently listed user names or passwords in the user information storage unit 15 matches. Then, similarly raising the value of variable i until the maximum value X, the number of stored user names (YES in Step S1037), it is checked in order whether or not any of the registered user information matches both the user name and the password.

If there is any that matches both the user name and the password (YES in Step S1034), "Panel Login" is set to the login status information 16a, the matched user name is set to the login user name 16c, and user counter information of matched user is set to the login user counter information 16b, in Step S1035.

If checking about all the registered user information is completed (YES in Step S1037), the process returns.

Figure 7:
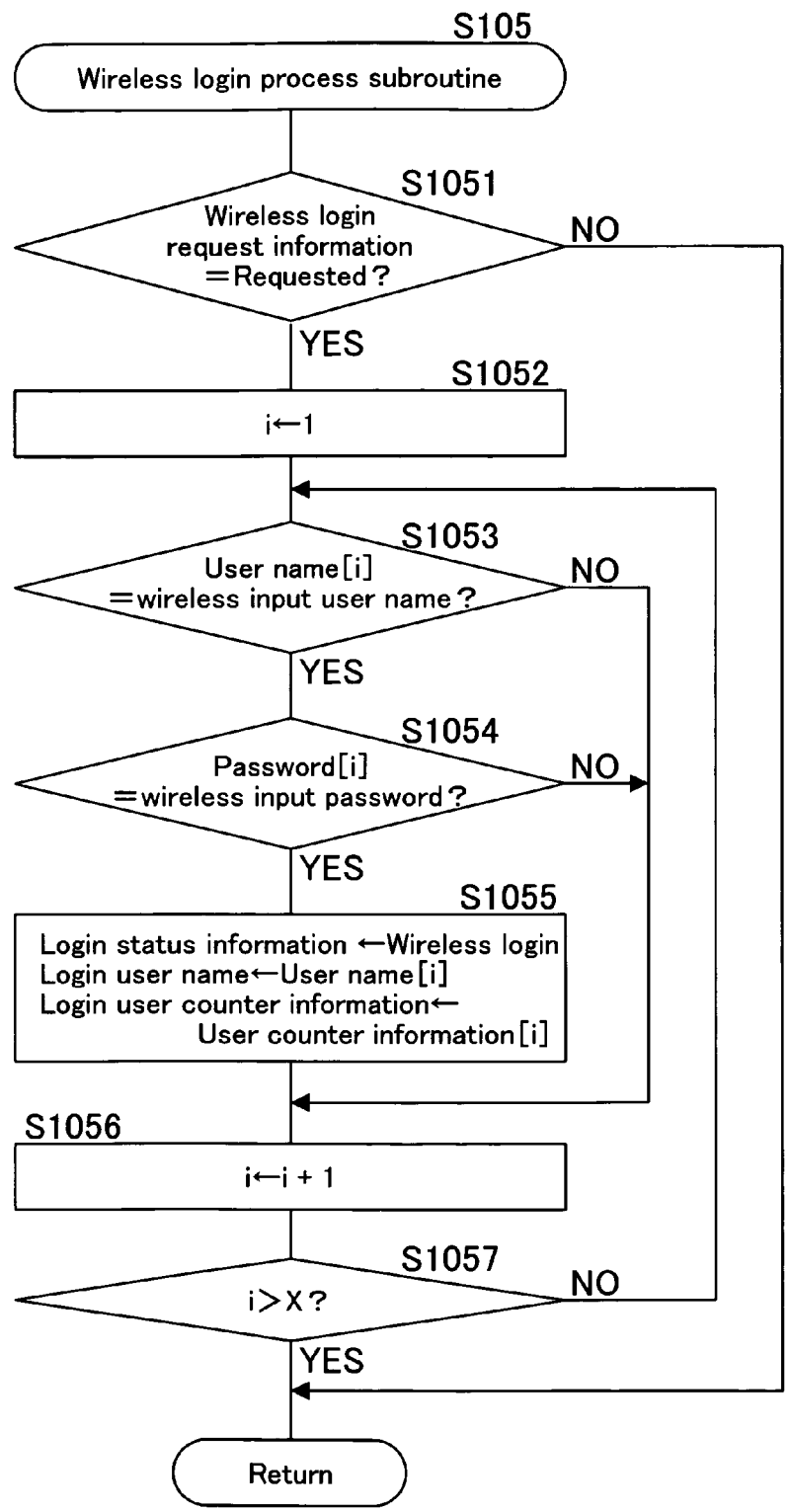
FIG. 7 is a flowchart showing a subroutine of wireless login process of FIG. 5.

FIG. 7 is a flowchart showing the subroutine of the wireless login process (step S105) in FIG. 5.

In Step S1051, it is checked whether or not the wireless login request information, which is one of the wireless terminal user information 12a, is "Requested". If it is not "Requested" (NO in Step S1051), the process directly returns.

If the wireless login request information is "Requested" (YES in Step S1051), then it is checked if there is any that matches the user name inputted by wireless, in order among the user information stored in the user information storage unit 15.

In other words, after "1" is set to the variable i in Step S1052, it is determined in Step S1053, whether or not a first listed user name in the user information storage unit 15 matches the user name inputted by wireless. If it matches (YES in Step S1053), it is determined in Step S1054 whether or not the passwords match each other.

If the user names or the passwords do not match (NO in Step S1053, or NO in Step S1054), the process proceeds to step S1056, where "2" is set to the variable i. Then, it is checked whether or not any of the subsequently listed user names and passwords in the user information storage unit 15 matches. Then, similarly raising the value of variable i until the maximum value X, the number of stored user names (YES in Step S1057), it is checked in order whether or not any of the registered user information matches both the user name and the password.

If there is any that matches both the user name and the password (YES in Step S1054), "Wireless Login" is set to the login status information 16a, the matched user name is set to the login user name 16c, and user counter information of matched user is set to the login user counter information 16b, in Step S1055.

If checking about all the registered user information is completed (YES in Step S1057), the process returns.

Figure 8:
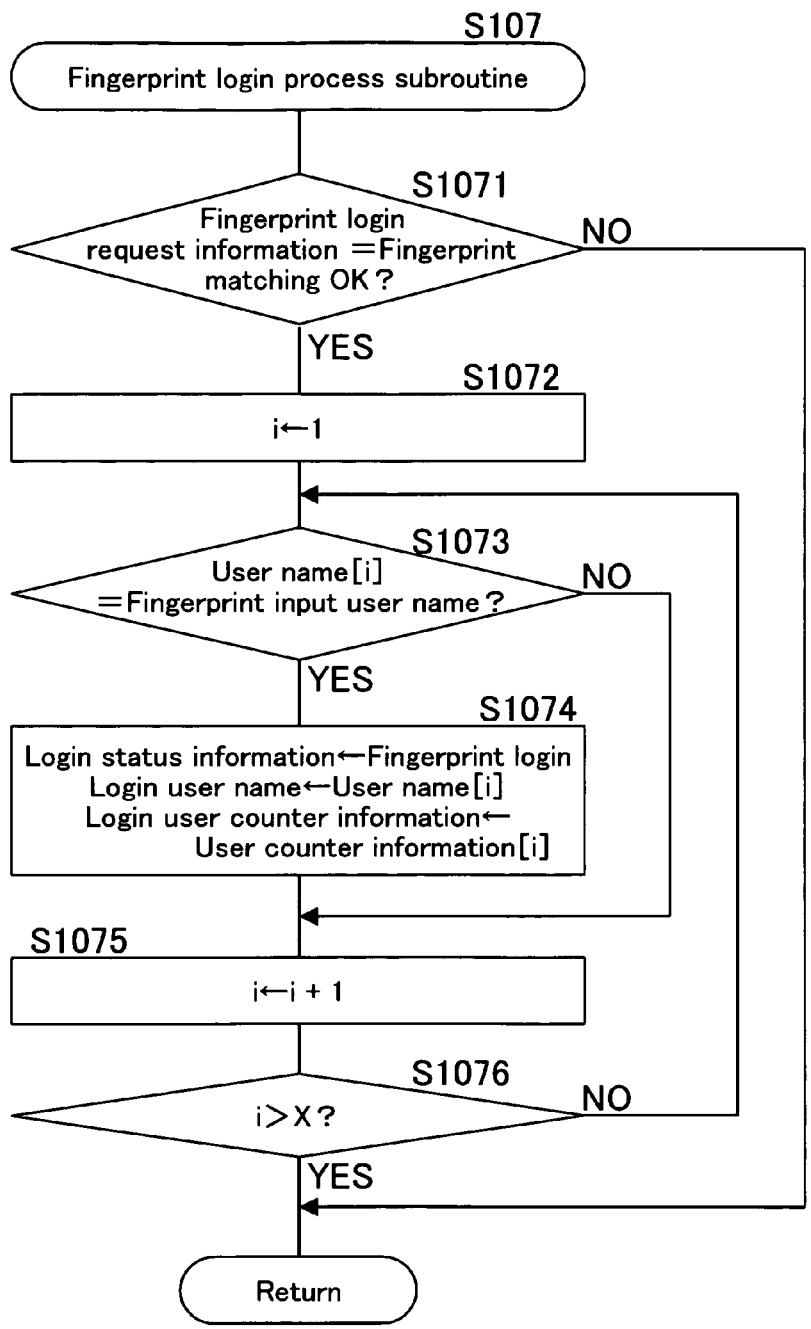
FIG. 8 is a flowchart showing a subroutine of fingerprint login process of FIG. 5.

FIG. 8 is a flowchart showing the subroutine of the fingerprints login process (Step S107) in FIG. 5.

In Step S1071, it is checked whether or not the fingerprint login request information, which is one of the fingerprint user information 13a, is "Fingerprint Matching OK". If it is not "Fingerprint Matching OK" (NO in Step S1071), the process directly returns.

If the fingerprint login request information is "Fingerprint Matching OK" (YES in Step S1071), then it is checked if there is any that matches the user name inputted by fingerprint, in order among the user information in the user information storage unit 15.

In other words, after "1" is set to the variable i in Step S1072, it is determined in Step S1073 whether or not a first listed user name in the user information storage unit 15 matches the user name inputted by fingerprint. If it doesn't match (NO in Step S1073), the process proceeds to step S1075, where "2" is set to the variable i. Then, it is checked whether or not any of the subsequently listed user names in the user information storage unit 15 matches. Then, similarly raising the value of variable i until the maximum value X, the number of stored user names (NO in Step S1076), it is checked in order whether or not any of the registered user information matches the user name.

If there is any that matches the user name (YES in Step S1073), "Fingerprint Login" is set to the login status information 16a, the matched user name is set to the login user name 16c, and user counter information of matched user is set to the login user counter information 16b, in Step S1074.

If checking about all the registered user names is completed (YES in Step S1076), the process returns.

Figure 9:
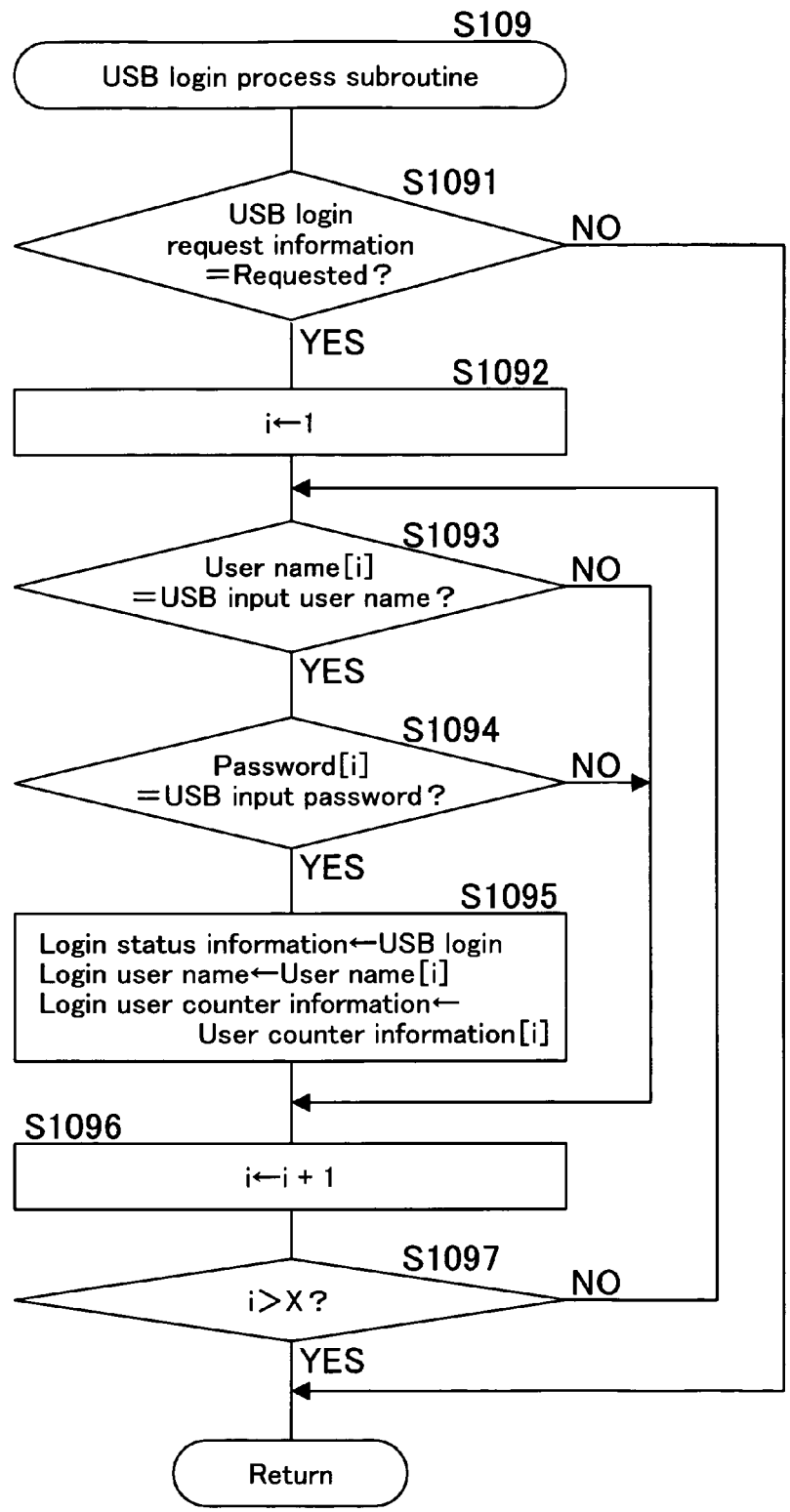
FIG. 9 is a flowchart showing a subroutine of USB login process of FIG. 5.

FIG. 9 is a flowchart showing the subroutine of the USB login process (Step S109) in FIG. 5.

In Step S1091, it is checked whether of not the USB login requests information, which is one of the USB user information 14a, is "Requested". If it is not "Requested" (NO in Step S1091), the process directly returns.

If the USB login request information is "Requested" (YES in Step S1091), it is checked whether or not there is any that matches the user name inputted by the USB device, in order among the user information stored in the user information storage unit 15.

In other words, after "1" is set to the variable i in Step S1092, it is determined in Step S1093 whether or not a first listed user name in the user information storage unit 15 matches the user name inputted by the USB device. If it matches (YES in Step S1093), it is determined in Step S1094 whether the passwords match each other.

If the user names or passwords do not match (NO in Step S1093 or NO in Step S1094), the process proceeds to step S1096, where "2" is set to the variable i. Then, it is checked whether or not any of the subsequently listed user names and passwords in the user information storage unit 15 matches. Then, similarly raising the value of variable i until the maximum value X, the number of registered user names (NO in Step S1097), it is checked in order whether or not any of the stored user information matches both the user name and the password.

If there is any that matches both the user name and the password (YES in Step S1094), "USB Login" is set to the login status information 16a, the matched user name is set to the login user name 16c, and user counter information of matched user is set to the login user counter information 16b, in Step S1095.

If checking about all the registered user information is completed (YES in Step S1097), the process returns.

Thus, a user is identified and MFP 1 accepts login of the authorized user.

Figure 10B:
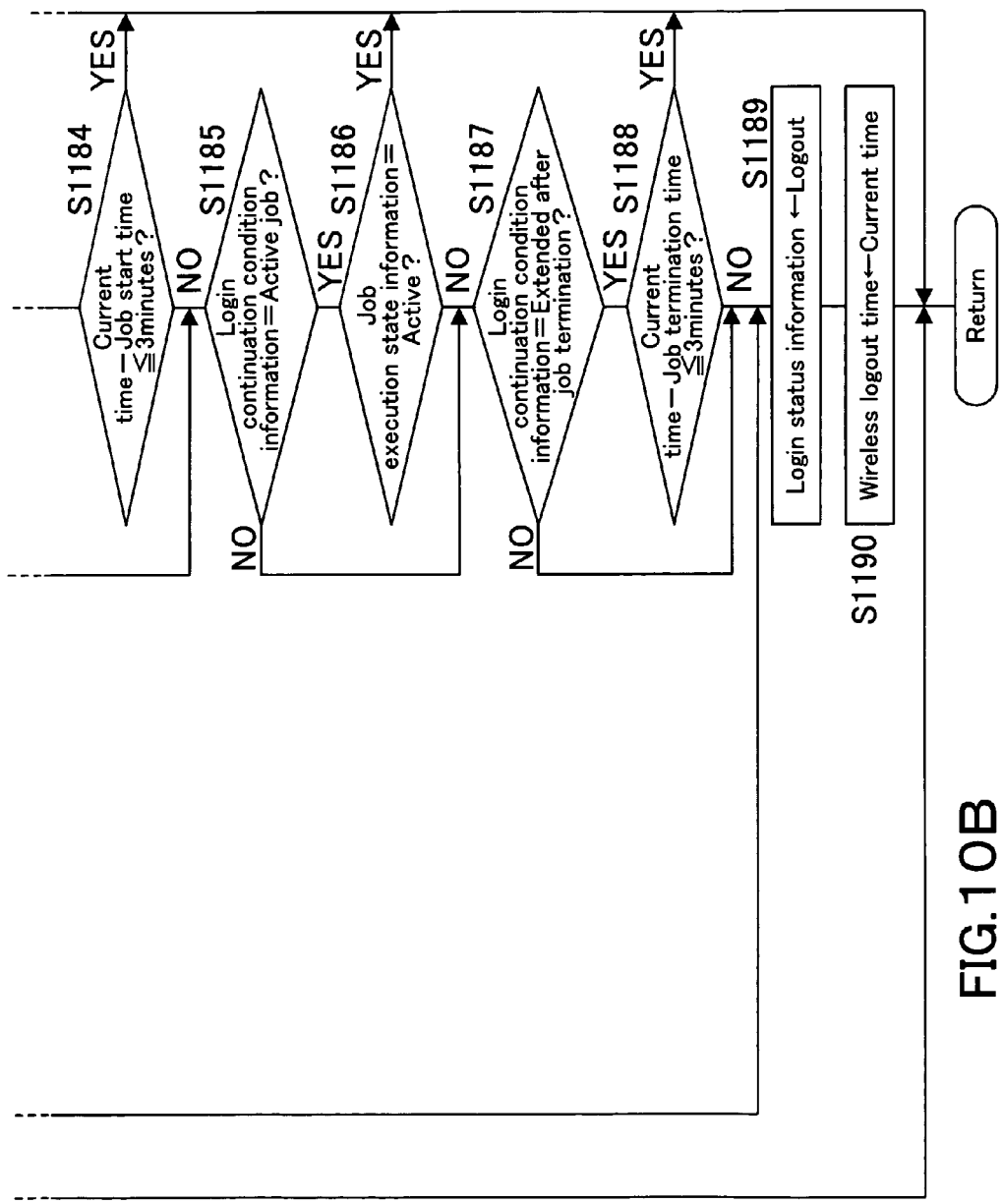
FIG. 10 is a flowchart showing a subroutine of wireless logout process of FIG. 5.

FIG. 10 is a flowchart showing the subroutine of the wireless logout process (step S117) of FIG. 5.

In Step S1171, it is checked whether or not the login status information 16a is "Wireless Login". If it is the wireless login (YES in Step S1171), it is then checked in Step S1173 whether or not the wireless login request information is "Not Requested". If the login status information 16a is not "Wireless Login" in Step S1171 (NO in Step S1171), or the wireless login request information is not "Not Requested" in Step S1173 (YES in Step S1173), either proceeds to step S1172, in which "Requested" is set to the last wireless login request information, and the process returns.

In Step S1173, if the wireless login request information is "Not Requested" (NO in Step S1173), it is determined in Step S1174 whether or not a gap between the current time and the wireless communication disconnected time is less than 5 minutes. If it is less than 5 minutes (YES in Step S1174), the process proceeds to Step S1175. If it is 5 or more than 5 minutes (NO in Step S1174), the process proceeds to Step S1189.

In Step S1175, it is checked whether or not the last wireless login request information is "Requested". If it is "Requested" (YES in Step S1175), the process proceeds to step S1177 after the current time is set to the wireless communication disconnected time in Step S1176, and "Not Requested" is set to the last wireless login request information. If it is not "Requested" (NO in Step S1175), the process directly returns.

In Steps S1177 to step S1187, the login continuation condition information set in advance is checked. First, in Step S1177, it is determined whether or not the login continuation condition Information is "Panel Operation".

If it is not "Panel Operation" (NO in Step S1177), the process proceeds to Step S1179. If it is "Panel Operation"

(Yes in Step S1177), it is determined in Step S1178 whether or not the panel operation information 11j is "Operated" or "Mode Setting Operated". If the panel operation information 11j is "Operated" or "Mode Setting Operated" (YES in Step S aS1178), the process directly returns because the login continuation conditions are satisfied, and the login is continued. If the panel operation information 11j is neither "Operated" nor "Mode Setting Operated" (NO in Step S1178), the process proceeds to Step S1179.

In Step S1179, it is determined whether or not the login continuation condition information is "Mode Setting". If it is not "Mode Setting" (NO in Step S1179), the process proceeds to step S1181. If it is "Mode Setting" (YES in Step S1179), it is then determined in Step S1180 whether or not the panel operation information 11j is "Mode Setting Operated". If the panel operation information 11j is "Mode Setting Operated" (YES in Step S1180), the process directly returns because the login continuation conditions are satisfied and the login is continued. If the panel operation information 11j is not"Mode Setting Operated" (NO in Step S1180), the process proceeds to Step S1181.

In Step S1181 it is determined whether or not the login continuation condition information is "Job Execution Start". If it is not "Job Execution Start" (NO in Step S1181), the process proceeds to step S1183. If it is "Job Execution Start" (YES in Step S1181), it is then determined in Step S1182 whether or not the job execution status information 10a is "Executing" or "Execution Terminated". If the job execution status information 10a is either "Executing" or "Execution Terminated" (YES in Step S1182), the process directly returns because the login continuation conditions are satisfied, and the login is continued. If the job execution status information 10a is neither "Executing" nor "Execution Terminated" (NO in Step S1182), the process proceeds to step S1183.

In Step S1183, it is determined whether or not the login continuation condition information is "Extended Login Time after Job Execution Start". If it is not "Extended Login Time after Job Execution Start" (NO in Step S1183) the process proceeds to S1185, and if it is "Extended Login Time after Job Execution Start" (YES in Step S1183), it is determined in Step S1184 whether or not a gap between the current time and the job start time is within 3 minutes. If it is within 3 minutes (YES in Step S1184), the process directly returns because the login continuation conditions are satisfied and the login is continued. If the gap between the current time and the job start time is more than 3 minutes (NO in Step S1184), the process proceeds to S1185.

In Step S1185, it is determined whether or not the login continuation condition information is "Active Job". If it is not "Active Job" (NO in Step S1185), the process proceeds to Step S1187. If it is "Active Job" (YES in Step S1185), it is then determined in Step S1186 whether or not the job execution status information 10a is "Active". If it is "Active" (YES in Step S1186), the process directly returns because the login continuation conditions are satisfied, and the login is continued. If it is not "Active" (NO in Step S1186), the process proceeds to Step S1187.

In Step S1187, it is determined whether or not the login continuation condition information is "Extended Login Time after Job Termination". If it is not "Extended Login Time after Job Termination" (NO in Step S1187), the process proceeds to step S1189. If it is "Extended Login Time after Job Termination" (YES in Step S1187), it is then determined in Step S1188 whether or not the gap between the current time and the job termination time is within 3 minutes. If it is within 3 minutes (YES in Step S1188), the process directly returns because the login continuation conditions are satisfied and the login is continued. If the gap between the current time and the job termination time is more than 3 minutes (NO in Step S1188), the process proceeds to Step S1189.

In Step S1189, "Logout" is set to the login status information 16a, and then in Step S1190, the current time is set to the wireless logout time, and the process returns.

The login status information 16a set as "Logout" is transmitted to the image processing control unit 18. Then, it is determined that the login status information is "Logout" through the determination process of Step S001 in FIG. 3 by the image processing control unit 18, the permission information is set to "Prohibited" in Step S024, and the wireless login is cancelled (logout).

In the present embodiment, after login, if regular communication with said wireless terminal is failed and the wireless login request information will be "Not Requested" (YES in Step S1173), then the last wireless login request information will be "Requested (YES at step 1175). If all the login continuation condition information is not set in advance, the user gets logged out. However, in Step S101 of FIG. 5, if a predetermined time (2 minutes in this example) has not yet elapsed after the wireless logout time (NO step S101), the process proceeds to step S110 skipping the login process (Step S103, Step S105, Step S107 and Step S109), thus no other user can login during the time. Thus, this method could let a user work continuously, preventing such in convenience that some other person is permitted to login while the user is logged out due to temporal absence.

In addition, even if the regular communication with the wireless terminal is failed and then the wireless login request information turns to "Not Requested" (NO in Step S1173), the login can be continued by operating or setting the mode from operation panel unit 11 (YES Step S1178 or Step S1180) under conditions where the login continuation condition information is "Panel Operation" (YES in Step S1177) or "Mode Setting" (YES in Step S1179). Since the user, who operates or sets a job mode using the operation panel unit 11 after login, seems most likely to continue using the MFP1 subsequently, this method could improve the user friendliness by continuing the login of said user.

In addition, even if the regular communication with the wireless terminal is failed and then the wireless login request information turns to "Not Requested" (NO in Step S1173), the login can be continued under conditions where the login continuation condition information is "Job Execution Start" (YES in Step S1181) and the job is active or terminated (YES in Step S1182). Since the user, who started job execution, seems mostly likely to continue using MFP 1 subsequently, this method could improve the user friendliness by continuing the login of said user.

In addition, even if the regular communication with the wireless terminal is failed and then the wireless login request information turns to "Not Requested" (NO in Step S1173), the login can be continued under conditions where the login continuation information is "Active Job" (YES in Step S1185) and the job is active (YES in Step S1186), and the login can be canceled under conditions where the login continuation information is "Active Job" and the job is terminated. Since the user, whose job is active, seems most likely to continue using MFP 1 subsequently, this method could improve the user friendliness by continuing the login of said user. On the other hand, since the user, whose job is terminated, seems less likely very much to continue using MFP 1 subsequently, this method could prevent the inconvenience of other users who suffer from extended login failure by cancelling the login of said user.

In addition, if the login continuation condition information is set to "Extended Login Time After Job Execution Start" (YES in Step S1183) and if a predetermined time (3 minutes in this example) has already elapsed since the job execution start (NO in Step S1184), the login is immediately cancelled since the user seems less likely to continue using MFP 1 subsequently. This method could prevent the inconvenience of other users who suffer from extended login failure by cancelling the login of said user.

In addition, if the login continuation condition information is set to "Extended Login Time After Job Termination" (YES in Step S1187) and if a predetermined time (3 minutes in this example) has already elapsed since the job termination time (NO in Step S1180), the login is immediately cancelled since the user seems less likely to continue using MFP 1. This method could prevent the inconvenience of other users who suffer from extended login failure by cancelling the login of said user.

In addition, in a case where the login is continued, if 5 minutes have already elapsed after the regular communication with the wireless terminal is failed and if the wireless login request information turns to "Not Requested" (YES in Step S1173), the further login is forcibly terminated (Step S1174).

Although one embodiment of the present invention has been described so far, it shall not be limited to the above embodiment. For instance, in the above embodiment, a user or an administrator can arbitrarily set or change the choice setting information such as the safety setting information, high security upper limit value information, low security upper limit value information, security level setting information, login continuation condition information, etc. In the present invention, those information may be set in advance as fixed default information.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image processor adapted to execute multiple types of jobs being different from each other, the image processor comprising:
    a user information storage unit for storing information of a plurality of users;
    a plurality of different types of user information input units for inputting user information;
    a user information matching unit for determining whether or not user information inputted by one of said user information input units matches any of the user information registered in said user information storage unit;
    a job processing control unit for prohibiting execution of a particular type of job among a plurality of different types of jobs or for limiting a number of job executions for the particular type of job based on a determination that the particular type of job has been requested by a user whose user information has been input by a first type of user information input unit and for allowing execution of the particular type of job based on a determination that the particular type of job has been requested by a user whose user information has been input by a second type of user information input unit; and
    a job processing unit for executing job allowed by the job processing control unit and instructed by a user, whose user information is determined to match any of the registered user information by said user information matching unit.

2. The image processor according to claim 1, wherein said job processing control unit restricts jobs instructed from the respective user information input units and the user information input unit comprises a receiving unit for receiving user information transmitted from wireless terminals that are provided for each user and perform wireless communication when enter the wireless communication coverage.

3. The image processor according to claim 2, comprising a login control unit for permitting a login to allow said job processing unit to execute jobs if said user information matching unit determines that the user information received by said wireless communication unit from a wireless terminal matches any of the user information registered in said user information storage unit, and after the login, terminating the login if regular communication between said wireless communication unit and the wireless terminal is failed, and prohibiting the login of other users until a predetermined time has elapsed after the login termination.

4. The image processor according to claim 2, comprising a login control unit for permitting a login to allow said job processing unit to execute jobs if said user information matching unit determines that the user information received by said wireless communication unit from the wireless terminal matches any of the user information registered in said user information storage unit, and after the login, continuing the login under a predetermined login continuation condition if regular communication between said wireless communication unit and the wireless terminal is failed.

5. The image processor according to claim 4, wherein said login continuation condition is that the user operates using the operation unit after the login.

6. The image processor according to claim 5, wherein said operation by the user is mode setting on a job that is to be executed by the job processing unit.

7. The image processor according to claim 4, wherein said login continuation condition is that said job processing unit starts job execution before regular communication between said wireless communication unit and the wireless terminal is failed.

8. The image processor according to claim 7, wherein said login control unit immediately terminates the login even after said job processing unit starts job execution, under conditions where a predetermined time has elapsed after the job execution start, if regular communication between said wireless communication unit and the wireless terminal is failed.

9. The image processor according to claim 7, wherein said login control unit immediately terminates the login even after said job processing unit starts job execution, under conditions where the job execution is terminated, if regular communication between said wireless communication unit and the wireless terminal is failed.

10. The image processor according to claim 7, wherein said login control unit immediately terminates the login even after said job processing unit starts job execution, under conditions where a predetermined time has elapsed after the job execution is terminated, if regular communication between said wireless communication unit and the wireless terminal is failed.

11. The image processor according to claim 4, wherein said login control unit forcibly terminates the login even in a case where the login is continued under a predetermined login continuation condition.

12. The image processor according to claim 1, wherein said job processing control unit restricts jobs instructed from the respective user information input units and each of the user information input units comprises an operation panel for inputting user information by a user.

13. The image processor according to claim 1, wherein said job processing control unit controls so as not to restrict jobs, if the user information input unit comprises a detection unit for detecting user specific biological information.

14. The image processor according to claim 1, wherein said job processing control unit controls so as not to restrict jobs, if the user information input unit comprises a receiving unit for receiving user information recorded in respective user information recording devices that are provided for each user, by connecting thereto.

15. The image processor according to claim 1, wherein the restriction by said job processing control unit involves image printing on a sheet.

16. The image processor according to claim 1, wherein the restriction by said job processing control unit involves transmission to an external machine.

17. The image processor according to claim 1, wherein the restriction by said job processing control unit is fax transmission.

18. The image processor according to claim 1, wherein the restriction by said job processing control unit is color image outputting.

19. A method of executing jobs in an image processor adapted to execute multiple types of jobs being different from each other, the method comprising the steps of:

receiving user information inputted from one of multiple different types of user information input units;

matching said received user information against user information registered in a user information storage unit;

setting permission for execution, prohibition for execution, or a limitation on execution on said respective multiple types of jobs depending on setting information set for the type of user information input unit used to input user information among said multiple user information input units and depending on the type of job, if said received user information is determined in the matching step, to match any of the user information registered in the user information storage unit; and executing said permitted jobs and/or prohibiting execution of said prohibited jobs.

20. The method of executing jobs according to claim 19, wherein said multiple types of jobs are at least two jobs from a copy job, a scan job, a PC print job, a FAX transmission job, and a FAX reception job.

21. The method of executing jobs according to claim 19, wherein job execution is set prohibited if said user information input unit comprises a receiving unit for receiving user information transmitted from the wireless terminals that are provided for each user and perform wireless communication when enter the wireless communication coverage.

22. The method of executing jobs according to claim 19, wherein job execution is set prohibited if said user information input unit comprises an operation unit for inputting user information by a user.

23. The method of executing jobs according to claim 19, wherein job execution is set permitted if said user information input unit comprises a detection unit for detecting user specific biological information.

24. The method of executing jobs according to claim 19, wherein job execution is set permitted if said user information input unit comprises a receiving unit for receiving user information recorded in respective user information recording devices that are provided for each user, by connecting thereto.

* * * * *